(12) United States Patent
Wiggs

(10) Patent No.: US 9,394,771 B2
(45) Date of Patent: Jul. 19, 2016

(54) SINGLE WELL, SELF-FLOWING, GEOTHERMAL SYSTEM FOR ENERGY EXTRACTION

(71) Applicant: B. Ryland Wiggs, Franklin, TN (US)

(72) Inventor: B. Ryland Wiggs, Franklin, TN (US)

(73) Assignee: Deep Well Power, LLC, Franklin, TN (US)

(*) Notice: Subject to any disclaimer, the term of this patent is extended or adjusted under 35 U.S.C. 154(b) by 722 days.

(21) Appl. No.: 13/751,610

(22) Filed: Jan. 28, 2013

(65) Prior Publication Data

US 2013/0192816 A1    Aug. 1, 2013

Related U.S. Application Data

(60) Provisional application No. 61/612,615, filed on Mar. 19, 2012, provisional application No. 61/668,238, filed on Jul. 5, 2012, provisional application No. 61/703,986, filed on Sep. 21, 2012, provisional application No. 61/714,784, filed on Oct. 17, 2012, provisional application No. 61/591,551, filed on Jan. 27, 2012, provisional application No. 61/657,223, filed on Jun. 8, 2012.

(51) Int. Cl.
  *F03G 7/00* (2006.01)
  *E21B 43/24* (2006.01)
  *E21B 36/00* (2006.01)
  *F03G 7/04* (2006.01)
  *F24J 3/08* (2006.01)

(52) U.S. Cl.
  CPC .............. *E21B 43/24* (2013.01); *E21B 36/001* (2013.01); *F03G 7/04* (2013.01); *F24J 3/086* (2013.01); *F24J 2003/087* (2013.01); *Y02E 10/16* (2013.01)

(58) Field of Classification Search
  CPC ......... E21B 43/24; E21B 36/001; F03G 7/04; F24J 3/086; F24J 2003/087; Y02E 10/16
  USPC ............................................ 60/641.2–641.4
  See application file for complete search history.

(56) References Cited

U.S. PATENT DOCUMENTS 3,782,468 A    1/1974  Kuwada
3,824,793 A    7/1974  Matthews
(Continued)

FOREIGN PATENT DOCUMENTS

CN    101696829 A    4/2010
DE     19932001 A1   1/2001
JP    2000161198 A   6/2000

OTHER PUBLICATIONS

International Search Report and Written Opinion for related International Appiication No. PCT/US2013/023242; report dated Jan. 25, 2013.

(Continued)

*Primary Examiner* — Hoang Nguyen
(74) *Attorney, Agent, or Firm* — Miller, Matthias & Hull LLP

(57) ABSTRACT

A renewable energy, single well, primarily self-flow, geothermal heat/power production system that acquires naturally occurring sub-surface geothermal heat to heat water and/or produce mechanical/electrical power using a heat exchangers or a turbine/generator. The sub-surface structures defining a working fluid flow path may be insulated, such as with vacuum insulation, to increase system efficiency and ensure a substantially self-generating working fluid flow.

12 Claims, 6 Drawing Sheets

(56) References Cited

U.S. PATENT DOCUMENTS

| | | | |
|---|---|---|---|
| 3,875,749 A | 4/1975 | Baciu | |
| 3,898,020 A | 8/1975 | Matthews | |
| 4,077,220 A | 3/1978 | Matthews | |
| 4,142,108 A | 2/1979 | Matthews | |
| 4,201,060 A | 5/1980 | Outmans | |
| 4,392,531 A * | 7/1983 | Ippolito | E21B 43/04 165/45 |
| 4,426,849 A | 1/1984 | Matthews | |
| 4,512,156 A * | 4/1985 | Nagase | F24J 3/084 165/45 |
| 4,590,386 A | 5/1986 | Wiggs | |
| 4,633,676 A | 1/1987 | Dittell | |
| 4,725,195 A | 2/1988 | Wiggs | |
| 4,878,540 A | 11/1989 | Raymond | |
| 5,272,879 A | 12/1993 | Wiggs | |
| 5,419,135 A | 5/1995 | Wiggs | |
| 5,706,888 A | 1/1998 | Ambs et al. | |
| 6,167,715 B1 | 1/2001 | Hebert | |
| 6,301,894 B1 | 10/2001 | Halff | |
| 6,668,554 B1 * | 12/2003 | Brown | E21B 41/0064 60/641.2 |
| 6,708,494 B1 * | 3/2004 | Hamann | F03G 7/04 60/641.2 |
| 6,931,879 B1 | 8/2005 | Wiggs | |
| 7,124,583 B2 | 10/2006 | Rider | |
| 7,578,140 B1 | 8/2009 | Wiggs | |
| 8,020,382 B1 * | 9/2011 | Zakiewicz | F03G 7/04 60/641.2 |
| 8,281,591 B2 | 10/2012 | Lakic | |
| 8,650,875 B2 * | 2/2014 | Wiggs | F03G 7/04 60/641.2 |
| 2005/0061362 A1 | 3/2005 | Graham | |
| 2006/0026961 A1 | 2/2006 | Bronicki | |
| 2007/0223999 A1 | 9/2007 | Curlett | |
| 2008/0016894 A1 | 1/2008 | Wiggs | |
| 2008/0173425 A1 | 7/2008 | Wiggs | |
| 2011/0252796 A1 | 10/2011 | Burkhart | |

OTHER PUBLICATIONS

Adelina P. Davis, Efstahios E. Michaelides; Geothermal Power Production form Abandoned Oil Wells; Energy 34 (2009); May 2, 2009; 866-872; Elsevier Ltd.; San Antonio, Texas.

Koji Morita, Makoto Tago, and Sacho Ehara; Case studies on Small-Scale Power Generation with Downhole Coaxial Heat Exchanger; Proceedings World Geothermal Congress 2005; Antalya, Turkey; Apr. 24-29, 2005.

Michael Pierce, Ken Fryrear, and Dave Marshall; Improving Binary Cycle Efficiency by Eliminating Parasitic Loads; GeoTek Energy, LLC; Midland, Texas; 1331-1336; GRC Transactions, vol. 35, 2011.

Hugh B. Matthews; Sperry Low Temperature Geothermal Conversion System-Phase I Contract No. DE-AC03-78ET27125 (Formerly ET-78-C-02-4633) and Phase II Contract No. DE-AC03-79-ET27131; DOE/ET/27125--T2-vol. 3; Sperry Research Center; Sudbury, MA 01776.

Zhe Wang; Modeling Study of a Single-Well Enhanced Geothermal System (EGS); Jun. 2009.

Zhe Wang, Mark W. McClure and Roland N. Horne; Modeling Study of Single-Well EGS Configurations; Stanford Geothermal Program, Department of Energy Resources Engineering; 367 Panama St., Stanford University, CA 94305-2220, USA; Apr. 2010.

Gopi Nalla, G. Michael Shook, Gregory L. Mines and K. Kit Bloomfield; Ineel/EXT-03-01433; Parametric Sensitivity Study of Operating and Design Variables in Wellbore Heat Exchangers; Idaho National Engineering and Environmental Laboratory; Idaho Falls, Idaho 83415; May 2004.

\* cited by examiner

SINGLE WELL, SELF-FLOWING, GEOTHERMAL SYSTEM FOR ENERGY EXTRACTION

CROSS-REFERENCE TO RELATED APPLICATIONS

This application claims the benefit of: U.S. Provisional Patent Application No. 61/612,615, filed on Mar. 19, 2012; U.S. Provisional Patent Application No. 61/668,238, filed on Jul. 5, 2012; U.S. Provisional Patent Application No. 61/703,986, filed on Sep. 21, 2012; U.S. Provisional Patent Application No. 61/714,784, filed on Oct. 17, 2012; U.S. Provisional Patent Application No. 61/591,551, filed on Jan. 27, 2012; and U.S. Provisional Patent Application No. 61/657,223, filed on Jun. 8, 2012.

FIELD OF THE DISCLOSURE

The present disclosure generally relates to geothermal energy extraction systems.

BACKGROUND OF THE DISCLOSURE

Geothermal energy extraction systems, such as geothermal power generating systems, are known as renewable energy sources with relatively low carbon emission footprints. A traditional geothermal power system generally may be classified in one of three conventional types, as follows:

(1) Dry steam power plants, which capture and use steam exiting from natural fissures in sub-surface rock, where deeper water has been boiled into steam via sub-surface heat, to drive a power generation turbine, with the turbine typically producing electricity. Dry steam power plants, however, are typically limited for use in areas that have naturally occurring conditions that are suitable for such use, and therefore there are relatively few dry steam power plant installations.

(2) Flash steam geothermal power plants, in which high-temperature and high-pressure water (typically at water temperatures around, or greater than, 180° C.) is artificially pumped (via large mechanical water pumps) under high pressure from typically deep wells to the surface. Upon reaching the surface, all or a portion of the very hot and high-pressure water is flashed into steam that may be used to drive turbines and/or generators.

For some flash steam plant installations, wells are drilled into natural brine water basins, with the brine water being pushed to the surface and out of the well by the naturally occurring elevated pressure of the brine water at depth, similar to some oil wells that do not require pumps because of the pressure at depth that naturally pushes the oil up and out of the well. However, in such flash steam plant systems, depletion of the original sub-surface water table is a serious environmental concern, as a significant amount of the sub-surface water may not condense and return to the basin, thereby necessitating the use of large-scale re-injection pumps to force the remaining condensation back down a separate return well.

Flash steam plants also use transport lines that are susceptible to mineral scaling by the brine water, which is an extremely significant problem that may necessitate frequent and costly de-scaling operations.

Still further, there are only a limited number of geographic locations that have conditions suitable to sufficiently pressurize water to produce viable amounts of electrical power, and it is economically infeasible to install and operate a flash steam plant in some of these locations. To be economically feasible for power production, the temperature of the hot water exiting the well may need to be 180° C. or more, and it is often costly to access sub-surface locations where the necessary heat and pressure naturally occur. Further, the use of large water pumps to pump water into and/or out of the well results in a significant parasitic load of the well's power production capacity.

For example, while it may be possible to access an area where the necessary temperature naturally occurs by drilling a deep enough well, such extremely deep wells would typically need to be about eight kilometers deep, as the temperature in the earth's crust reportedly increases about 22-27° C. per mile of depth from the surface. There are areas in the world where molten magma is found closer to the surface, and such areas are referred to as geothermal "hot spots". However, such "hot spots" are relatively rare and are sought after for use by flash steam plant systems. To be economically viable, such "hot spots" often need to provide sufficiently heated water/brine within approximately 3 kilometers of the earth's surface.

To provide economically viable working fluid pressure differentials for the turbine and generator, which are situated between the geothermal heat source and the cooler/condenser utilized in such systems, the water must be super-heated by a significant temperature level that is typically found only at extreme depths. When a column of water is subjected to extreme depths, the water pressure increases at approximately 0.433 pounds per square inch ("psi") per foot of depth. The elevated pressure at great depths prevents extremely hot water from boiling as it circulates into and out of a very deep well. Therefore, at least one (and typically two) large, power-consuming, water circulating pump(s) is/are necessary, among other equipment, for a flash steam power production plant. Also, as mentioned, the scaling of minerals on the interior walls of the brine water transport lines poses a serious maintenance cost issue, since, unless the continuous build up of scaling is removed, the design brine water flow is restricted and design flow rates and corresponding power production levels are impaired.

(3) Binary cycle power plants may operate at lower temperature ranges than conventional flash steam plants, but ultimately they also drive a power generating turbine that typically drives an electrical generator. In a binary cycle power plant, hot water or steam that is heated geothermally or by waste heat (such as from nuclear or fossil fuel power plants, or the like) is transported by a pump through a first primary water loop to a heat exchanger. The heat exchanger transfers most of the heat to a secondary closed loop that is used for power production.

Conventional binary geothermal power systems use at least one water loop (typically with an open loop at the bottom of the well) that circulates water within a geothermal heat source to acquire heat. That heat is then exchanged, in an above-ground heat exchanger, with a separate above-ground refrigerant loop used to generate power. Most conventional geothermal power systems are classified as binary systems, and typically require at least two primary heat exchange loops and at least two (and usually at least three) fluid circulating pumps.

In what is commonly referred to as an enhanced geothermal system (EGS), at least two separate wells are drilled a sufficient distance apart. Next a special fluid (often containing dangerous chemicals) and/or a pressurized gas is force-pumped into at least one of the wells so as to fracture the sub-surface hot rock (similar to "fracking" in the oil and gas industry). Then, pumps circulate the primary water/brine working fluid into and out of each respective well, with at least one well and pump being utilized as a return water/brine well and pump (so water, with heat extracted by and within the water to refrigerant heat exchanger, can be pumped back down into the sub-surface geology to regain heat), and with at least another well and pump being utilized as a supply water/brine well and pump, so geothermally heated water/brine can be pumped up to the surface for circulation through the heat exchanger that transfers heat to the secondary working fluid power generation loop.

At the surface of either a traditional binary system or an EGS design, the heated water is sent through a heat exchanger (typically a plate to plate heat exchanger or a tube within a tube heat exchanger, or the like), where the heat within the water/brine is absorbed and removed by a colder secondary working fluid having a materially lower boiling point than water, such as a refrigerant (e.g., R-134A), propane, or the like. Heat naturally flows from the hot primary working fluid (water/brine) into the colder secondary working fluid (refrigerant), as heat naturally flows to cold (Fourier's Law).

Although the primary working fluid water/brine is very hot (usually, but not always, well over the boiling point of water), even when the water/brine's temperature exiting the well exceeds the boiling point of water, it does not boil because of its very high pressure acquired via being circulated at a significant depth. As the pressure of a liquid working fluid increases, the boiling point of the working fluid also increases, as is well understood by those skilled in the art.

The geothermally supplied heat extracted from the primary working fluid by the refrigerant secondary working fluid both vaporizes and pressurizes the refrigerant/secondary working fluid, which may then be used to actuate a turbine and/or generator to produce electricity. The lower pressure refrigerant exiting the turbine/generator is then directed through a condenser (typically either air or water cooled), where the secondary working fluid changes phase back to a liquid and is then force-pumped (via a liquid refrigerant pump) back into the heat exchanger with the geothermally heated water to repeat the process.

However, in either a binary or an EGS geothermal power system, the power consumption required by the one or more primary working fluid water/brine circulating pumps is a significant parasitic electrical load that reduces the effective amount of electrical power generated by the system. The parasitic power draw of the liquid pump in the secondary above-ground power generating loop is also a negative factor.

In addition to the foregoing, there are other offshoot types of geothermal power production systems. For example, some systems use the heat available in hot (fully or partially molten) magma (in the 650° C. range), in volcanoes, or in hot dry rocks, or in geysers, etc.

Thus, the current binary geothermal power production plants require somewhat uniquely occurring circumstances to be economically viable, typically require at least two independent fluid loops (with typically at least two to three artificial and power parasitic liquid pumps required for system operation), and the geothermal "hot spots" generally necessary for economic viability are not universally available. Binary systems utilizing waste heat sources are more common, but either nuclear or fossil fuels are typically required as the primary heat source, both of which present well-understood environmental drawbacks.

The EGS designs may present additional environmental drawbacks by: producing seismic activity when fracturing hot dry rocks between deep wells; contributing to groundwater pollution when rock fracturing chemicals seep into aquifers; releasing significant quantities of carbon dioxide emissions (sometimes almost as much as that produced by a coal-fired power plant); and losing significant quantities of water on a continuous basis via condensing efforts at the surface and/or in the lowermost open loop portion of the deep wells deep (thereby depleting otherwise available natural water supplies).

While there are other known renewable and generally environmentally safe alternative energy sources, such as solar and wind, these alternative power sources are contingent upon uncontrollable conditions, such as the availability of sufficient sunshine or wind. Consequently, these more environmentally friendly alternatives are not reliable for day-to-day, consistent energy production. Even hydroelectric power production is dependent on adequate rainfall to maintain optimum design conditions.

SUMMARY OF THE DISCLOSURE

Embodiments of environmentally safe, economically feasible, geothermal power production systems are disclosed herein. The benefits of these systems include: the ability to be employed almost anywhere in the world, regardless of the availability of geothermal hot spots; eliminating sub-surface water-table depletion; eliminating issues associated with fracking, such as earthquake and ground water pollution; eliminating transport line scaling and related maintenance issues; and eliminating carbon dioxide emission issues. Further, the geothermal power systems disclosed herein may significantly reduce or eliminate the parasitic power draw associated with a liquid pump used during system operation, thereby increasing operational efficiencies, reducing system operation and maintenance costs, and improving the overall environmental impact and economic feasibility of geothermal power systems.

One of the primary designs disclosed herein, which materially contributes to the maximum power generation abilities and economic viability of geothermal power systems, is the strategic use of a high vacuum insulation surrounding selected portions of transport lines that direct the working fluid through the system. A vacuum insulation is herein defined as a space having at least a partial vacuum pressure. Some of the geothermal power system embodiments disclosed herein may additionally include a gas absorbing material, such as gas absorbing pellets, within the vacuum space. Still further, some embodiments may include a layer of radiant insulation material disposed in the vacuum space. The inclusion of gas absorbing pellets and/or radiant insulation may improve or help maintain the partial vacuum pressure within the space, thereby providing a more effective vacuum insulation under sub-surface geological conditions.

Known binary and EGS designs generally have an above-ground portion that includes: (1) a closed loop secondary working fluid circulated within a heat exchanger, which heat exchanger is in thermal contact with the geothermally heated primary working fluid; (2) a power generating turbine/generator; (3) a secondary working fluid condenser; and (4) typically a secondary working fluid liquid pump for forcing the secondary working fluid back into the heat exchanger. Since the design and operation of such above-ground secondary working fluid loops are well understood by those skilled in the art, this portion of a binary/EGS design will not be shown in any great detail herein.

As used herein, the term "sub-surface" refers to the area below a surface of the ground and/or water. Also, when a "line" is referred to herein, the line may alternately be defined as a "pipe" or the like.

Additionally, as used herein, the term "energy extractor" is defined as a power generator, a heat exchanger, and other energy extraction apparatus. Typically, such energy extractor would be located above the surface of one of ground and water, and would usually be at least one of a liquid pressure driven turbine/generator, a vapor driven turbine/generator, a working fluid expansion turbine/generator, a supercritical turbine/generator, and a heat exchanger (all of which are well understood by those skilled in the art).

As one optional solution to the issues surrounding conventional renewable energy sources, as well as conventional geothermal power production facilities, Wiggs, in U.S. patent application Ser. No. 12/963,611, filed on Dec. 8, 2010, discloses a means to access geothermal heat using a refrigerant working fluid within a deep well, where a first insulated line, within a given well casing, returns cooled refrigerant to the lower hot portion of the well, and where a second insulated line, within the same well casing, supplies geothermally heated refrigerant, from the lower hot portion of the well, up and out of the well to a turbine generator, through a condenser, and back into the well to repeat the cycle. However, subsequent detailed computer analysis and actual small-scale field testing has disclosed that while the system disclosed in the Wiggs '611 application will work, the two separate insulated working fluid transport lines occupy a significant amount of the space provided within the well casing, thereby limiting the flow rate of the working fluid and, consequently, the amount of power output that can be achieved by the system. According to certain aspects of this disclosure, therefore, a geothermal power system is provided that maximizes the working fluid flow rate within a given well and casing size so as to maximize available power production. According to other aspects of this disclosure, a geothermal power system is provided that may use water as the working fluid in the closed loop, sub-surface portion of the system, thereby avoiding the expense and deleterious environment effects associated with some conventional refrigerants.

Generally, with all other factors being equal, the power production level of a geothermal power system increases as the working fluid flow rate and/or the well depth increases. An increased well depth may advantageously increase working fluid pressure as the generally cooler working fluid travels down the well, and may also increase the amount of available geothermal heat that is typically available at greater depths as the working fluid more closely approaches the earth's core. According to certain aspects of this disclosure, a geothermal power system is provided that may provide one or more of the following: (1) maximizes working fluid flow rates within the fully sealed casing of one single deep well; (2) maximizes gravitational pressure levels acting on the working fluid in the well; and (3) maximizes the ability of the working fluid to absorb the warmest possible heat from the surrounding geology, all while being both cost effective and environmentally friendly.

It should also be noted that, absent any turbine/generator, the systems disclosed herein may be used as heat acquisition systems that simply provide heated working fluid. The heated working fluid may be used in any domestic, commercial, or industrial process. After the auxiliary process receives heat from the working fluid, the then-cooled working fluid may simply be returned to the well (by gravity and/or pump), where the working fluid may re-acquire geothermal heat and repeat the process.

Further, the well casing used in the geothermal power systems disclosed herein may be tightly sealed to provide a closed loop for the working fluid, thereby enabling various portions of the well casing, between the casing interior surface and a working fluid line exterior surface, to be used to circulate working fluid.

BRIEF DESCRIPTION OF THE DRAWINGS

For a more complete understanding of this disclosure, reference may be made to the embodiments illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The following detailed description is not intended in a limiting sense, and is made solely for the purpose of illustrating the general principles of this subject matter. The various features and advantages of the present disclosure may be more readily understood with reference to the following detailed description taken in conjunction with the accompanying drawings.

Figure 1:
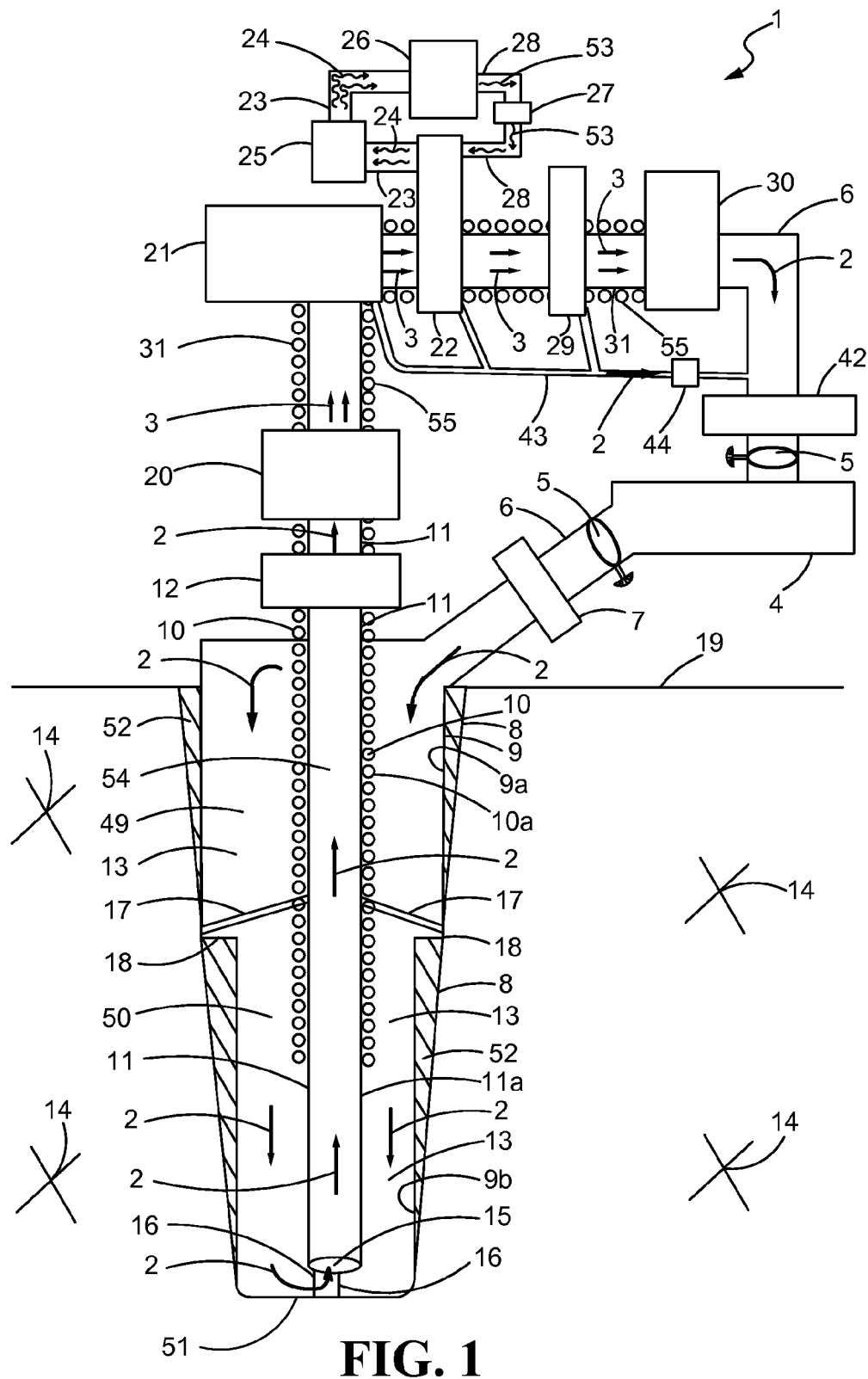
FIG. 1 is a side view of a single well, self-flowing, geothermal energy extraction system in which a cool liquid phase working fluid flows to the bottom portion of a deep well through the space/area between the interior wall of the well casing and the exterior wall of a mostly insulated liquid working fluid supply line, and where the working fluid, after acquiring geothermal heat as it travels down the well, is then transported up and out of the well through the mostly insulated supply line where it exits the well, next traveling though turbine/generators and heat exchangers before it travels through a condenser and re-enters the well to repeat the process.

Referring now to the drawings in detail, where like numerals refer to like parts or elements, FIG. 1 is a side view, not drawn to scale, of a single well, self-flowing, geothermal system 1 for at least one of power generation, heat acquisition, and energy extraction. The system 1 may have a liquid phase working fluid (the working fluid is not shown, but its directional flow is indicated by a single arrow 2 in its liquid phase, and is indicated by double arrows 3 in its vapor phase) stored in a liquid holding tank 4. For the working fluid flow direction 2 through a well 8 as shown in FIG. 1, advantageous working fluids 2 may be water, a water solution (such as water and salt), a refrigerant, such as R-134A, $CO_2$, and the like.

A tank 4 may hold a volume of working fluid 2 that is sufficient for use by the system 1 during initial system 1 start-up, and which may store the liquid phase working fluid 2 during system 1 shut down for servicing. Two cut-off valves 5 may be disposed in an above-ground liquid working fluid transport line 6 (located above a ground surface 19) and respectively upstream and downstream of the tank 4. The valves 5 may be selectively closed to isolate the liquid working fluid 2 in the tank 4. Although not shown herein, additional valves (similar to the cut-off valves 5) may be positioned around any component of the system 1 (such as a liquid drive turbine generator 12, for example) to facilitate maintenance of the system 1.

When the cut-off valves 5 are open as shown in FIG. 1, the liquid working fluid 2 may flow, by gravity, to an optional liquid pump 7. The pump 7 may augment system start-up and/or supplement the natural flow rate of the working fluid 2 in the system 1. However, as most or all of the working fluid 2 flow within the system 1 will be effected by natural gravitational forces, if the single pump 7 is provided it may have a relatively smaller capacity than that of a liquid pump normally used in conventional power generation systems, which require relatively large pumps to circulate liquid working fluid.

After exiting the optional liquid pump 7, the liquid working fluid 2 may enter a well casing 9 disposed in the well 8. The well casing 9 may define an upper casing interior surface 9a and a lower casing interior surface 9b. In the illustrated embodiment, the upper casing interior surface 9a defines an upper casing cross-sectional area that is relatively larger than a lower casing cross-sectional area defined by the lower casing interior surface 9b. For example, the upper and lower casing interior surfaces 9a, 9b may both be generally cylindrical, and the upper casing interior surface 9a may have a diameter that is larger than a diameter of the lower casing interior surface 9b.

A working fluid 2 return pathway 13 is provided for communicating cooler working fluid 2 from the tank 4 down into the well 8, within the otherwise empty annular space between the exterior wall of the partially insulated 10 supply line 11 and the interior wall/surface of the casing 9a and 9b. A working fluid 2 supply pathway 54 is provided for communicating geothermally heated working fluid 2 from the bottom 51 portion of the well 8 up and out of the well 8 to a liquid drive turbine/generator 12 located above the ground surface 19. As shown in FIG. 1, a working fluid transport line 31 is provided downstream of the first optional turbine/generator 12 for communicating working fluid, in one of liquid and vapor form 2,3, through the other components of the system 1 located above the ground surface 19.

Figure 2:
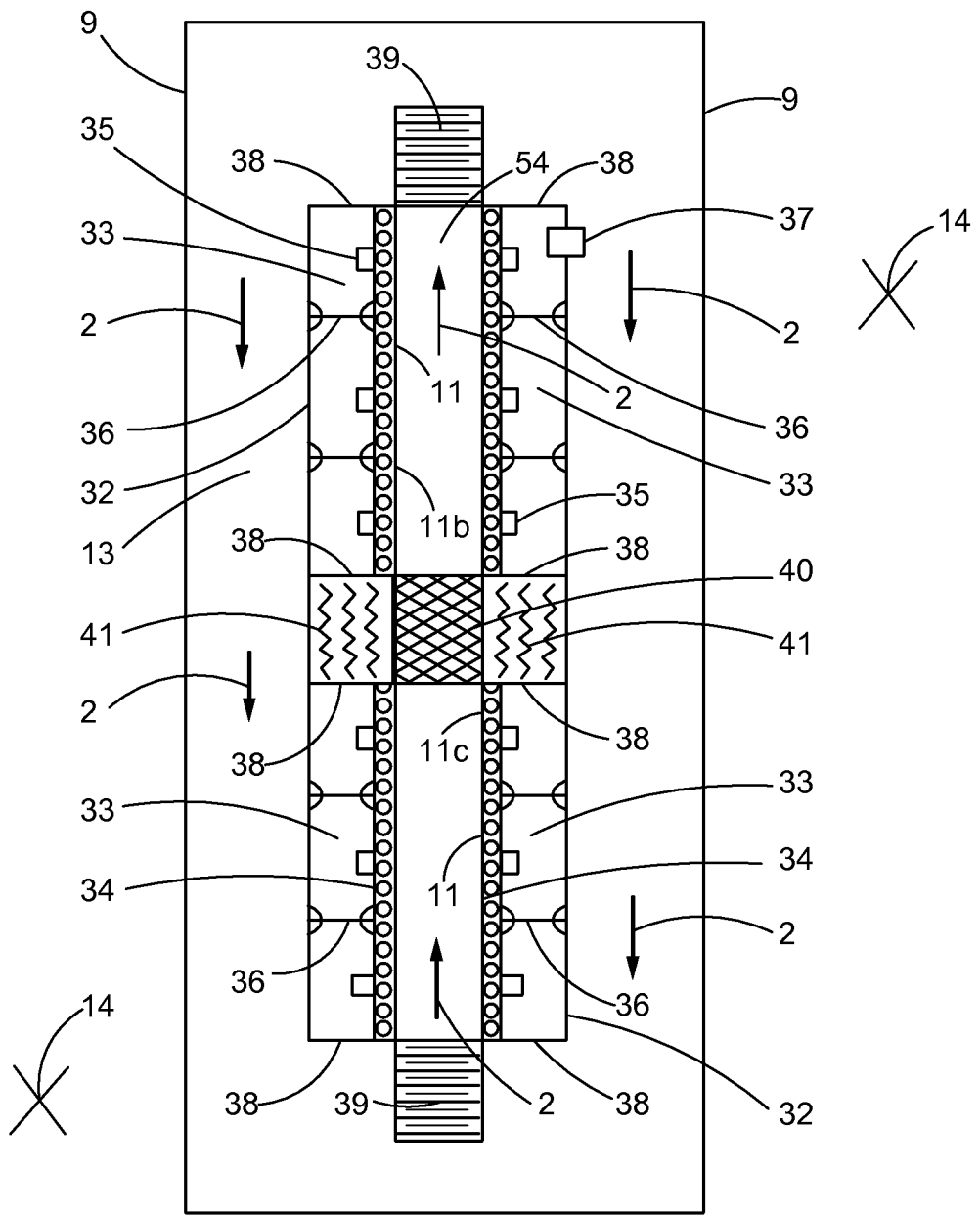
FIG. 2 is a side view of a vacuum insulated working fluid line within a well casing segment.

An insulation layer 10 surrounds a majority of the segment of the liquid working fluid 2 supply line 11 disposed within the casing 9, as well as all of the liquid working fluid 2 supply line 11 located above the casing 9 leading to, and exiting, the first liquid drive turbine/generator 12 (as well as any additional power generating components not shown in FIG. 1). Additionally, an insulation layer 55 may surround all of the vapor working fluid transport line 31. The insulation layers 10, 55 may include vacuum insulation, which is more fully described below in connection with FIG. 2. Applicant has found that the vacuum insulation may be approximately five to ten times more efficient than other known forms of insulation. The couplings (such as the threaded ends 39 threaded/screwed together 40, as shown in FIG. 2) between any vacuum insulated line segments (shown as an upper line segment 11a and as a lower line segment 11b in FIG. 2 as an example) may optionally be insulated 10 with one of a vacuum and a solid-state insulation 10 material.

The segment of the supply line 11 disposed within the casing 9 is shown having a uniform interior size and cross-sectional area. Alternatively, this segment of the supply line 11 may have an interior cross-sectional area that decreases as the depth below the ground surface 19 increases, thereby to reduce adverse friction effects on the liquid phase working fluid 2 as it flows up through the interior of the supply line 11 and out of the well 8. An example of a decreasing size supply line 11 with depth is shown hereinafter in FIG. 3.

The portion of the fluid supply line 11 disposed within the casing 9 may be generally located near a center of the casing 9. This portion of the supply line 11, alternatively referred to herein as a conduit and/or a central line, may be substantially coaxial with the casing 9. Alternatively, the conduit may be disposed along a conduit axis that is offset from an axis of the casing 9, and therefore the term "central line" should not be construed as requiring a coaxial arrangement between the return line 157 and the casing 109. When the conduit or central line portion of the supply line 11 is positioned near the center of the casing 9 as shown in FIG. 1, the liquid working fluid 2 exiting the tank 4 (and optional pump 7) may flow through a first annular space 49 (also identified as the working fluid return pathway 13) between the upper casing interior surface 9a and the exterior surface 10a of the insulation 10. From the first annular space 49, the liquid phase working fluid 2 next flows into a second annular space 50 (also still comprising the working fluid return pathway 13) between the lower casing interior surface 9b and an exterior surface 11a of the supply line 11. A portion of the second annular space 50 (also the working fluid supply pathway 54) may extend between the lower casing interior surface 9b and the exterior surface 10a of the insulation 10. Working fluid flow 2 from the upper annular space 49 to the lower annular space 50 may be entirely due to gravity or may be augmented by the optional pump 7.

As the liquid phase working fluid 2 travels down into the well 8, it absorbs heat from the adjacent sub-surface geology 14. This is due to the fact that heat naturally travels to cold (Fourier's Law), and due to the fact that the core of the earth is extremely hot (according to some reports, the earth's core may be hotter than the surface of the sun). Thus, in general, the deeper the well 8, the hotter the adjacent geology 14 may become. When the liquid working fluid 2 first enters the well 8, it is in its coldest, and therefore most dense, and heaviest state. As the liquid working fluid 2 travels down the well 8 and gains heat, the molecules of the working fluid 2 naturally expand (due to the increased heat energy being absorbed), becoming less dense, lighter, and more buoyant. Thus, at the bottom 51 of the well 8, the liquid working fluid 2 is the hottest and least dense. Therefore, via the subject disclosure, the denser liquid working fluid 2 entering the well 8 will naturally push the less dense liquid working fluid 2 up and out of the well 8.

The working fluid could optionally be water, a refrigerant (such as R-134A or carbon dioxide), or the like. In certain applications, applicant has found that water may be advantageous for both reduced costs and increased environmental safety factors. Further, water may be relatively easy to condense, via a condenser 30, back into a liquid phase working fluid 2 under the temperatures and pressures that naturally occur near the ground surface 19.

During operation, a continuous supply of a liquid working fluid 2 traveling into and out of the well 8 will gain heat within the well 8, but the working fluid 2 may not reach the temperature of the geology 14 surrounding the lower most portion of the well 8 unless the flow is stopped for a period of time. However, testing has shown that a steady-state geothermal heat transfer level may be obtained at a given working fluid 2 flow rate within the well 8 to produce a relatively constant and reliable power generation source. Thus, depending on the actual working fluid 2 flow rate within the well 8 and the actual geological 14 temperature conditions surrounding the well 8 (e.g., normal temperature gradients, or a geothermal hot spot, etc.), actual field testing has shown that insulating 10 only an upper portion of the working fluid supply line 11 may be sufficient. Specifically, the insulation 10 may be needed only for the portion of the supply line 11 that is at a temperature below that of the design steady-state temperature of the liquid working fluid 2 exiting the well 8. Such insulation 10 is generally expensive, and therefore efficiently insulating 10 the supply line 11 only to the extent necessary reduces system costs.

Near the bottom portion 51 of the well 8, the supply line 11 is shown with both an inlet opening 15 and with legs 16. The inlet opening 15 may be formed at the lowest extent of the supply line 11, and the legs 16 support to the supply line 11 so that the inlet opening 15 may be spaced above the bottom of the casing 9, thereby permitting sufficient flow of working fluid 2 into the supply line 11. The bottom lowermost portion 51 of the well 8 may include a solid, sealed base, such as plate steel or the like. Arms 17 or other support structures may be provided inside the casing 9 to support the supply line 11 in the desired position.

Figure 3:
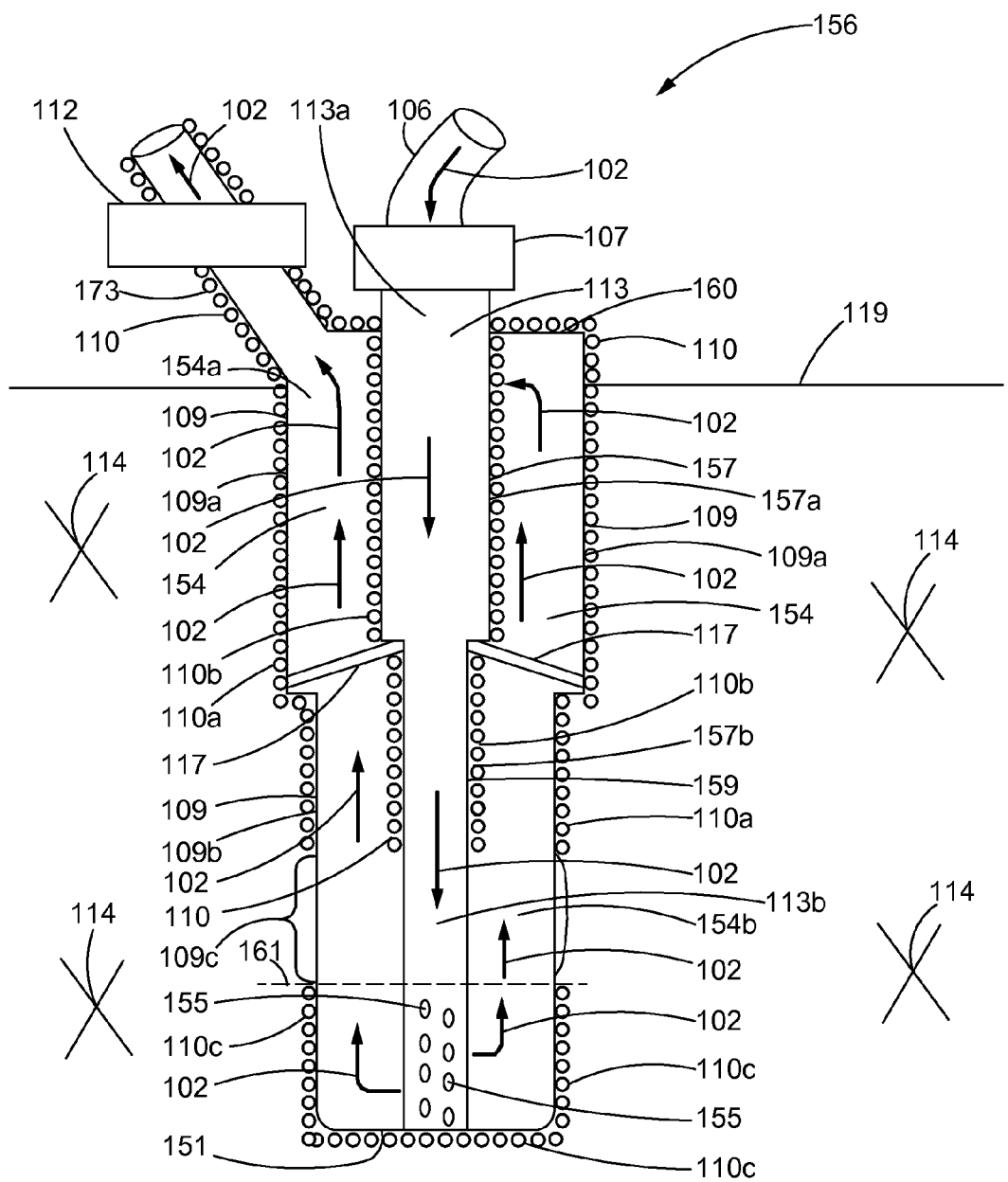
FIG. 3 is a side view of a geothermal energy extraction system having a liquid flow design in which a cool liquid phase working fluid flows to the bottom portion of the well casing through a centrally located, mostly insulated line first flow path; where the liquid working fluid exits the central line at/near the bottom distal end of the well casing, which distal end of the well casing is fully insulated, but only to a point above the discharge of the working fluid from the centrally located line into the space between the exterior wall of the line and the interior wall of the casing; and where the working fluid is then transported up and out of the well through the space/area between the insulated liquid working fluid return line; and where an upper portion of the well casing itself is insulated from and above a level where the temperature of the surrounding geology is cooler than the design temperature of the working fluid as it exits the well.

In the alternative embodiment of a partial geothermal system (156 shown in FIG. 3), although the flow direction of the working fluid 2 within a well (8 in FIG. 1) is reversed in FIG. 3 from that shown herein in FIG. 1, if the working fluid 2 flow direction in FIG. 3 were to be the same as shown herein in FIG. 1, the supply line 11 shown herein may extend entirely to a sealed bottom portion 51 of the lower casing segment 9b, so that the casing 9 bottom portion 9b directly supports the weight of the supply line 11. In such a working fluid 2 reverse flow direction within a well (8 in FIG. 1) from that shown herein in FIG. 1, a lower portion of the supply line 11 may be perforated with holes (shown as 155 in FIG. 3) and/or slots, or the like, having an aggregate cross-sectional area sufficient to permit the desired working fluid 2 flow rate into the supply line 11.

It is well understood by those skilled in the art of drilling that when very deep wells (8 in FIG. 1) are formed, decreasingly smaller sized well casing segments (typically comprised of steel walled casing 9) may be used. In the exemplary embodiment of FIG. 1, therefore, the well casing 9 includes segments in the form of a larger upper casing 9a portion and a smaller lower casing 9b portion. While FIG. 1 illustrates only two such segments 9a, 9b, it will be appreciated that more than two casing segments with different sizes may be used. In contrast to the perforated casing typically used in oil and gas wells, as well as in contrast to the perforated and/or open bottom loop casing wells used for flash or traditional binary geothermal systems, the well casing 9 (including the casing bottom portion 51) of the subject disclosures may be fully sealed from the surrounding sub-surface formation/geology 14.

The well 8 may be an existing well or a newly drilled well. When installed within an existing well 8 having casing 9 that has maintained a substantially good integrity, the existing well casing 9 may only require cleaning. Additionally, the bottom 51 of the existing well 8 may need to be plugged shut prior to installing the supply line 11 and insulation 10. If the integrity of the existing well casing 9 is questionable, a new casing 9 may be formed and/or inserted inside the originally existing casing 9 prior to installing the supply line 11. In any event, any empty annular space between the interior wall of the original casing 9 and the exterior wall of any new casing, at locations where geothermal heat transfer is desired, may be filled with a heat conductive fill 52 material, such as water and/or a heat conductive grout, just as any empty space between the interior wall of the well 8 and the exterior wall of the casing 9 may be filled with a heat conductive fill 52 material in areas where geothermal heat transfer was advantageous.

Braces 17 may extend from the supply line 11 to an intermediate joint 18 between the upper portion 9a and the lower portion 9b of the casing 9 to help support the weight of the supply line 11. The location and form of the braces 17 shown in FIG. 1 are merely exemplary, as other support structures may be used to support the supply line 11 at any location within the well 8.

The gravitational force of the colder, denser, and heavier liquid phase working fluid 2 entering and traveling down the well 8 may overcome the head pressure of gravity between the top and bottom of the well 8 as it relates to the warmer, less dense, and lighter working fluid exiting the well 8, thereby to push the geothermally heated and less dense liquid phase working fluid 2 up through the supply line 11 and out of the well 8. When water is used as the working fluid 2, the head pressure is approximately 0.433 psi for each foot of depth below the surface 19. However, since the heated liquid phase working fluid 2 exiting the well 8 has expanded and is less dense than the cooler liquid phase working fluid 2 entering the well 8, a density and weight differential exists in the working fluid 2 loop within the well 8. The density and weight differential between the cooler, denser, and heavier working fluid 2 at the top of the well 8 and the warmer, less dense, and lighter working fluid at the bottom of the well 8 is sufficient to exceed the head pressure within the supply line 11, thereby to push the warmer, less dense, and lighter working fluid 2 through the supply line 11 and up and out of the well 8.

Any excess pressure differential created between the colder, heavier and warmer, lighter working fluids 2 present at or near the ground surface 19, may be captured by one of multiple design turbine/generators, such as, for example, by a by a liquid driven turbine/generator 12, as the liquid phase hot working fluid 2 initially exits the well 8. Thus, the system 1 may utilize gravity to produce mechanical and/or electrical power, all in addition to utilizing an additional expansion and/or vapor driven turbine/generator 21 to produce additional power via the working fluid's gain of naturally renewable geothermal heat. As would be well understood by those skilled in the art, a single turbine/generator (although not shown herein) that operates on both pressure and expansion could optionally be utilized instead of the liquid drive turbine/generator 12 and the vapor driven turbine/generator 21 shown herein as examples only. In such event, the single pressure and expansion turbine/generator may be positioned where at least one of the liquid drive turbine/generator 12 and the vapor drive turbine/generator 21 is shown herein in FIG. 1.

Thus, unlike conventional binary and EGS systems, the geothermal system 1 uses both gravity and geothermal heat to produce mechanical and/or electrical power. The working fluid 2 flow needed to generate this power may be obtained with either no pump, or with a pump 7 having a relatively small capacity as compared to the working fluid flow rate (and therefore having a correspondingly small operational efficiency adverse parasitic power draw).

If the pressure differential between the liquid phase working fluid 2 entering and exiting the well 8 is insufficient to warrant the use of the optional liquid driven turbine/generator 12, the liquid drive turbine/generator 12 would simply not be installed in the system 1. In such event, the geothermal heat acquired by the working fluid 2 would produce power in a vapor driven turbine 21 and/or in any conventional above-ground geothermal/EGS power production equipment. However, even absent a liquid drive turbine/generator 12, the ability to eliminate all of, or much of, the parasitic pumping loads required via conventional geothermal power system designs is extremely advantageous and cost effective. Although, in wells 8 that are very deep (such as, for example, about three kilometers or more), it is expected that the excess pressure differential would be sufficient to operate the liquid driven turbine/generator 12.

After exiting the optional liquid driven turbine/generator 12, the still liquid phase working fluid 2 may next enter an optional vaporization chamber 20. The vaporization chamber 20 may include an enlarged vessel having a sufficient volume to induce the hot liquid working fluid exiting the well 8 to flash into a vapor phase working fluid 3 in response to the natural pressure reduction. The hot vapor phase working fluid 3 may exit the vaporization chamber 20 and then proceed into an optional vapor driven turbine/generator 21, where mechanical/electrical power is produced via the force of the hot vapor 3. Alternatively, if a vaporization chamber 20 is not provided, a working fluid expansion turbine/generator (which is well understood by those skilled in the art) may be used in place of the vaporization chamber 20 and the vapor drive turbine/generator 21.

It should be noted that while FIG. 1 shows only one liquid driven turbine/generator 12 and only one vapor driven turbine/generator 21, multiple such respective turbine/generators 12, 21 may be provided using distributed transport lines. The use of multiple turbine/generators 12, 21 may permit servicing of one of the turbine/generates 12, 21 without necessitating shut down of the entire system 1. In this regard, each turbine/generator 12,21 may have an intentionally over-sized power producing capacity, so that if only one of the turbine/generators 12,21 is operated (such as while the other turbine/generator 12 or 21 is being serviced), the operational pressures in the system 1 may be increased through the operative turbine/generators 12 or 21 to minimize any reduction in effective total overall system 1 power output due to the out of service turbine/generator 12, 21 (as examples). Although not precisely shown herein in the drawing, in order to provide for servicing any individual turbine/generator 12,21, shut off valves (which may be similar to the cut-off valves 5 described above) may be placed both before and after each respective turbine/generator 12, 21.

After exiting the vapor driven turbine/generator 21, the still hot (but reduced in pressure and temperature) vapor phase working fluid 3 may next travel through a first heat exchanger 22. The first heat exchanger 22 may be provided as a plate heat exchanger, a tube in tube heat exchanger, or any other conventional heat exchanger Design. Such optional heat exchanger 22 designs are all well understood by those skilled in the art and are, therefore, not shown herein in any detail. The vapor phase working fluid 3 traveling through the first heat exchanger 22 may transfer heat to a conventional secondary working fluid loop of a binary geothermal system, or to some other secondary power production means that utilized heat. The full conventional secondary working fluid design of a conventional binary geothermal system (although some basic embodiments are shown herein via components 23, 25, 24, 26, 28, 53, 27, 53, and 28, as hereinafter more fully explained) is not shown in great detail, as same is well understood by those skilled in the art.

The working fluid (typically a refrigerant) of the conventional binary system that is vaporized and pressurized in the first optional heat exchanger 22 may exit the heat exchanger 22 through a binary system vapor exit line 23. In the binary system closed loop, the vapor refrigerant directional flow is shown by double wavy arrows 24. The binary system has an exiting vapor line 23 operably connected to a binary system refrigerant vapor driven turbine/generator 25, with the refrigerant working fluid 24 still in a vapor phase. The vapor phase refrigerant 24 next travels through a binary system condenser 26, where the refrigerant 24 is cooled and condensed into a liquid phase refrigerant 53 (shown by a single wavy arrow 53). The now liquid phase refrigerant 53 is pumped, via a binary system liquid refrigerant pump 27, back into the primary heat exchanger 22 to regain heat, become vaporized and pressurized, and repeat the power production cycle of the binary system.

If the pressure differential between the working fluid 2 entering and exiting the well 8 is not sufficient to operate a liquid drive turbine 12, and a vapor or expansion turbine 21 is not provided, the geothermally heated liquid phase working fluid 2 alternatively and optionally may be directed directly to the heat exchanger 22 for use in a traditional binary system power generation. By using only the below ground surface 19 components of the system 1 with a binary system, most or all of the parasitic power draw from traditional binary system sub-surface water/brine pumps is eliminated, thereby decreasing environmental impact and increasing the feasibility of such binary systems for power production.

Returning again to the primary geothermal system 1, the vapor phase working fluid 3 may have a further reduced temperature and pressure upon exiting the first optional heat exchanger 22, and may be directed to a second optional heat exchanger 29, where the remaining, but now lower level, heat can again be transferred into at least one of an additional optional power production means (such as a secondary closed loop binary system, or the like) and a heating only application (such as supplying heat for hot water purposes, or the like).

After exiting the second optional heat exchanger 29, the vapor phase working fluid 3 may flow into a condenser 30. The above ground surface 19 condenser 30 may be air-cooled, water-cooled, or a combination thereof. Both air-cooled and water-cooled condensers 30, situated above the ground surface 19, are well understood by those skilled in the art. The condenser 30 cools the vapor phase working fluid 3 of the primary system 1 back into a liquid phase working fluid 2. The liquid phase working fluid 2 exiting the condenser 30 may flow through the upstream cut-off valve 5 and into the tank 4, where the working fluid 2 flow and power production/heat production process may continuously repeat.

The primary system 1 may produce mechanical and/or electrical power from one or more power turbines/generators, such as 12 and 21 shown herein as examples, and may also, alone or in conjunction with power production, produce heat for any purpose (such as heating hot water, or the like). Exemplary power generators include the liquid driven turbine/generator 12, the vapor driven turbine/generator 21, and an expansion turbine/generator (as already explained), a supercritical turbine/generator, or the like, all of which are well understood by those skilled in the art. If an expansion turbine/generator were to be utilized, it would be utilized as one entity in lieu of the two entity vaporization chamber 20 and vapor drive turbine/generator 21 shown herein, and it would be situated where the vaporization chamber 20 is herein shown, so as to insure any exiting condensed liquid phase working fluid 2 would naturally flow via gravity back into one of the optional holding tank 4 and the well casing 9. Here, even after exiting at least one turbine/generator (such as a liquid drive turbine/generator 12 and a vapor drive turbine/generator 21 shown herein as an example) any remaining sufficient heat can be utilized within the first optional heat exchanger 22 to power a first binary system, as well as (when still enough heat is remaining) within the secondary optional heat exchanger 29 to at least one of power a second binary system, or the like, and to provide heat for heating purposes, or the like. Optionally, the primary system 1 may produce useable energy/work from more than one power production source simultaneously, such as via a liquid drive turbine/generator 12, via a vapor driven turbine/generator 21, and via at least one heat exchanger 22 used for supplying heat for at least one of a heating purpose and to operate the above-ground surface components of a binary system. Herein, as an example, as explained, a basic above-ground surface 19 binary system consists of the basic elements shown herein, comprised of a binary system vapor line 23, a binary system refrigerant driven turbine/generator 25, a binary system condenser 26, a binary system liquid refrigerant pump 27, as well as binary system liquid refrigerant transport return lines 28, transporting liquid phase refrigerant 53, and binary system vapor refrigerant transport lines 23, transporting vapor phase refrigerant 24.

The primary system 1 may also produce a pre-determined amount of mechanical and/or electrical power on a continual basis by operating one or more selected power generators (i.e., the liquid driven turbine/generator 12, the vapor driven turbine/generator 21, the first optional heat exchanger 22 utilized to power the first binary system, the secondary optional heat exchanger 29 utilized to power the second binary system, or the like), while maintaining the option, during periods of high and/or peaking electrical demand, to engage more than one, or all, of the associated power generators, thereby to optimize the preferred power output level at selected peak demand times.

Testing has shown that maximizing the power output ability of the system 1, by simultaneously operating multiple potential power generating elements, such as, for example, the liquid drive turbine/generator 12, the vapor drive turbine/generator 21 and the heat exchanger 22 to the first binary system, will lower the otherwise higher temperature of the geology 14 surrounding the well 8, resulting in some degradation of total overall power output abilities for extended run times. However, if power output is maximized solely during temporary peak periods of electrical power demand, the temperature of the geology 14 surrounding the well 8 will have time to recover for use during the next temporary peaking period, absent any significant overall power output degradation to the intended standard and more normalized steady-state power output design.

Also, while power output of the system 1 is directly dependent on temperature levels within the surrounding geology 14 (i.e., the higher the temperature the more power output ability), and is directly dependent upon well 8 depth (i.e., the deeper the well 8 the greater the pressure and the more power output ability), it is also directly dependent upon the mass flow rate of the working fluid 2. Therefore, at least one of the cut-off valves 5 may be operated as a flow control valve to only partially close the full design flow rate of the working fluid 2, thereby to provide additional means to regulate a desired power output level at any given time.

Thus, although conventional binary and EGS designs, as well as flash geothermal power production designs, are all intended to only produce relatively steady-state electrical power production, usually to the maximum extent possible, the exemplary designs disclosed herein by the self-flow geothermal power generating system 1 incorporate an optional design improvement permitting additional power to be generated from a given single well 8 during peak electrical power usage times by engaging more than one power production means and/or adjusting the flow rate of the liquid phase working fluid 2.

Still further, while the above-disclosed system 1 incorporates multiple geothermal power production system 1 advantages, the herein shown liquid driven turbine/generator 12, vaporization chamber 20, and vapor driven turbine/generator 21, could all potentially be combined into at least one power production turbine/generator (not shown herein), such as a super-critical turbine/generator, or the like. Super-critical turbine/generators, which are especially advantageous when a super-critical working fluid 2 is utilized), as well as multiple other types of turbine/generators, are well understood by those skilled in the art and are, therefore, not detailed herein.

Yet an additional third optional heat exchanger 42 may be associated with the power generator system 1. As shown in FIG. 1, the third heat exchanger 42 may be disposed in the working fluid transport line segment 6 exiting the condenser 30 but prior to the optional liquid pump 7. The third heat exchanger 42 may be associated with at least one of another above ground surface 19 binary system (as generally described hereinabove) and a heating means (for hot water heating purposes, or the like). Yet additional heat exchangers (not shown) may also optionally be disposed in the above-ground liquid phase working fluid 2 transport line 6 portion/segment situated between the third optional heat exchanger 42 and the liquid pump 7 (although not shown herein, even the holding tank 4 itself may optionally be utilized for heat exchange to another fluid), so long as sufficient heat remains in the liquid phase working fluid 2 to economically so warrant. The inclusion of a third, or more, heat exchanger 42, or at least as many heat exchangers (such as 22, 29, and 42 shown herein as examples) as possible is advantageous because of the ability to optionally produce more useful work from the one single well 8, and also because the working liquid fluid 2 entering the well 8 is cooled to the maximum extent reasonably possible, which cooling assists in increasing the gravitational pressure differential between the working fluid entering and exiting the well 8, and hence increases liquid phase working fluid 2 pressure to produce more mechanical and/or electrical power via the liquid drive turbine/generator 12, all from the single well 8.

An optional condensate drain line 43 is shown in fluid communication with the vapor driven turbine/generator 21, the first heat exchanger 22, and the second heat exchanger 29. A downstream end of the condensate drain line 43 fluidly communicates with the above-ground liquid phase working fluid transport line 6 at a point between the condenser 30 and the third optional heat exchanger 42. The condensate drain line 43 may transport liquid working fluid that is condensed from vapor phase into liquid phase in the turbine/generator 21, first heat exchanger 22, and/or second heat exchanger 29. However, the liquid phase fluid 2 in the condensate drain line 43 will still be warmer than the liquid phase working fluid 2 exiting the condenser 30, thereby affording opportunity for at least the third heat exchanger 42 to produce additional useful heat transfer related work. An optional and relatively small condensate line liquid pump 44 may be installed for assistance, as necessary, in moving condensed liquid working fluid 2 through the condensate drain line 43 and into the primary above-ground liquid phase working fluid transport line 6 before entering at least one of the optional third heat exchanger 42 and the liquid holding tank 4.

Power generating equipment and heat exchanger equipment that uses and/or that produces vapor phase working fluid 3 (such as the turbine/generator 21, heat exchangers 22, and 29, where a phase change from a vapor working fluid 3 to a liquid working fluid 2 may occur before the working fluid enters the system's 1 condenser 30, may be located at an elevation at least one of equal to and above that of at least one of the condenser 30 and the liquid holding tank 4, to facilitate gravity flow of the liquid phase working fluid 2 into at least one of the condenser 30 and the liquid holding tank 4.

If the primary system 1 does not include a turbine/generator 12, 21 for electrical power production, as explained, the system 1 may alternatively be used to simply produce and provide heated working fluid 2 (the working fluid 2 may optionally be comprised of one of a refrigerant, water, and a water and other element, such as salt or the like, mixture). After useful heat was removed from the working fluid 2 in at least one heat exchanger, 22, 29, and 42, or the like, the now cooled working fluid 2 may simply be re-circulated back into at least one of the holding tank 4 and the well 8 under the force of gravity, or with the optional assistance of a relatively small pump 7 when advantageous, thereby to reacquire geothermal heat from the sub-surface geology 14 and repeat the process.

FIG. 2 is a side view, not drawn to scale, of an enlarged well casing segment 9, within which is located a liquid phase working fluid supply line 11 surrounded by a secondary line 32. At least a partial vacuum pressure is generated within an empty space 33 between an exterior surface of the supply line 11 and an interior surface of the secondary line 32, thereby to provide a vacuum insulation 33 around the supply line 11 within an effective sealed vacuum chamber 33. The vacuum chamber 33 is herein also shown and identified as an empty space 33. The vacuum chamber 33 is under at least a partial vacuum pressure. The vacuum chamber 33 is also additionally herein referenced as a vacuum insulation 33. A layer of radiant heat transfer insulation 34 (such as layered and fiber separated reflective foil, or the like) may be disposed around the supply line 11. Gas absorbing pellets 35 may be disposed within the space 33, and spacers 36 may be provided to maintain the supply line 11 in spaced relation to the secondary line 32.

No known traditional geothermal power production systems include highly efficient, sub-surface insulated, and/or vacuum insulated, fluid transport tubing (such as at least via a partial vacuum insulated space 33 as noted above), likely due to the perception that the surrounding sub-surface geology 14 will warm up and adequately insulate the well casing 9, which casing 9 pipe in and of itself is conventionally used to transport a geothermally heated liquid working fluid 2 to the surface, as well as to the fact that traditional geothermal power production designs do not require and/or take advantage of naturally occurring gravitational forces, because traditional designs are intended to solely utilize heat for power production purposes. In traditional binary and/or EGS system designs, liquid water pumps (such as the optional liquid working fluid pump shown as 7 in FIG. 1, but typically larger in size) have traditionally been used to circulate water/brine water into, and back out of, the sub-surface geology 14 so as to acquire naturally occurring geothermal heat, as is well understood by those skilled in the art.

Further, as mentioned, there are two primary factors in achieving optimum results via any conventional geothermal power system design. Namely, heat and working fluid flow rate. The higher the heat, the more the power production ability, and the higher the flow rate, the more the power production ability. Since the highest possible geothermal heat level is a premium useful energy/work production factor, the disclosure herein of the application and utilization of a vacuum insulation space 33 is of premium importance. Analysis has indicated that via using a vacuum insulation 33, a geothermally heated supply working fluid 2 may lose no more than about six percent (and sometimes less than one percent) of its heat as it travels up and out of a well (8 in FIG. 1). Regarding working fluid 2 flow rates, via the designs disclosed herein of utilizing the interior of only one separate primary working fluid transport line 11 within the well casing 9 for a working fluid supply flow pathway 54 (herein shown as a supply pathway 54 up and out of the well, shown as 8 in FIG. 1), and by utilizing the otherwise empty annular space between the interior wall of the casing 9 and the exterior wall of the secondary pipe 32 (affording a vacuum insulation 33) as a working fluid return flow pathway 13 (herein shown as a return pathway 13 into the well (8 in FIG. 1), the space available inside the casing 9 within which to provide a supply pathway 54 and a return pathway 13 for the working fluid 2 is maximized.

As also disclosed herein, a third primary factor in achieving optimum results has traditionally been overlooked, namely, the force of gravity, which, as disclosed herein, can be combined with heat and flow rates to achieve greater power production efficiencies from a given well (8 in FIG. 1). Further, since high quality geothermal heat is a premium useful energy/work production factor, the disclosure of the utilization of a vacuum space insulation 33 within a geothermal power/heat production system (1 in FIG. 1) is extremely significant.

The disclosed system (1 in FIG. 1) may optimally insulate the supply line 11 by providing vacuum space insulation 33, radiant heat transfer insulation 34, and spacers 36 to keep the supply line 11 and the secondary line 32 from thermal contact with one another, all while requiring a gap at least as small as approximately only one-quarter inch between the supply line 11 and the secondary line 32. Additionally, the provision of gas absorbing pellets 35 within the vacuum space 33 would be of an additional optional benefit in obtaining the best possible vacuum insulation 33 results, as hydrogen gas, or the like, can migrate into some types of steel.

A strong vacuum pump (not shown herein but well understood by those skilled in the art) may be operatively coupled to an access plug 37 to pull an initial vacuum within the vacuum space 33, after which the plug 37 may be sealed shut. Thereafter, the entire piping segment comprised of the supply line 11 and the surrounding secondary line 32, which secondary line 32 has been secured/welded to the supply line 11 via joint caps 38, or the like, is heated to a sufficient temperature to activate the gas absorbing pellets 35, to remove at least a portion of any remaining gas from within the vacuum space 33.

In order to increase the flow rate of the liquid phase working fluid 2, the supply line 11 may have threaded ends 39, as opposed to more traditional couplings/collars that would take up additional space, thereby reducing the maximum flow rate through the casing 9. Here, two respective supply line 11 segments, a first line segment 11b and a second line segment 11c, which segments 11b and 11c are of the same size, are shown as being threaded together to form an intermediate joint 40 in the middle portion of the well casing 9 segment.

Since drilling rigs, which are well understood by those skilled in the art) typically require about a two foot grip area to lower any piping (such as 11, 32), casing (such as 9), or the like, into a well (8 in FIG. 1), the secondary line 32 segments surrounding the supply line segments, 11b and 11c, may be about one foot shorter than the respective supply line segments, 11b and 11c, at each respective end. This leaves an exposed approximate two foot long area per supply line segment, 11b and 11c, (which segments, 11b and 11c, are typically about thirty to forty feet long each) that is not surrounded by vacuum insulation 33. To overcome this otherwise exposed two foot long portion of the supply line segment, a pre-constructed insulating sleeve 41 formed of a thermal insulating material may be placed around the threaded end 39 of one of the supply line segments, 11b for example, prior to being joined to the other supply line segment 11c. Thus, when the two supply line segments, 11b and 11c, are attached, the insulating sleeve 41 is positioned so as to effectively surround the otherwise thermally exposed area.

Since the insulating sleeve 41 is a relative short segment, typically about only two feet long, it may optionally be constructed of a high quality solid state insulation material or a vacuum insulation similar to the vacuum space 33 disclosed herein. While a vacuum insulation 33 may be more effective than any other insulation means, it may also be more costly. Thus, depending on the length of the supply line 11 within the total well casing depth, the economics of what type of insulated sleeve 41 to utilize may be considered, when comparing the respective insulation values and heat transfer losses against cost differentials.

The vacuum insulation 33 provided around the supply line 11 may also help to prevent heat transfer between the heated liquid phase working fluid 2 exiting the supply line 11 and the cooled liquid phase working fluid 2 entering the upper portion of the well casing 9. A vacuum space insulation 33, although more costly to provide, is about five to ten times more efficient than a very good solid-state or any other known type of insulation material.

Thus, since system operation is dependent on the cooled liquid phase working fluid 2 entering and traveling down through the upper portion of the well (8 in FIG. 1) while remaining relatively cool (surrounding sub-surface geology 14 temperatures are relatively cool near the surface, remaining at about the average mean surface air temperature at an approximate 20 meter depth), and is dependent on the geothermally heated, liquid phase working fluid 2 exiting the well (8 in FIG. 1) within the vacuum insulated 33 supply line 11 remaining as hot as possible, so as to effect a gravitational pressure differential to reduce or eliminate artificial pumping power requirements, and so as to provide a source of gravitational pressure differential for additional mechanical/electrical power generation, the subject disclosed vacuum space insulation 33 advantageously improves overall system (such as 1 in FIG. 1, as an example) performance. Further, as explained, the vacuum insulation 33 design disclosed herein, of a secondary line 32 closely surrounding the liquid working fluid supply line 11 (with a vacuum space 33 within the interior otherwise empty area between the supply line 11 and the secondary line 32), advantageously maximizes the liquid working fluid 2 supply and return flow rate area that is possible within a given well casing 9 diameter (as opposed to installing two separate, space consuming, return and supply fluid transport lines within one single well casing, as disclosed by Wiggs in his aforesaid '611 application).

FIG. 3 is a side view of at least one of a geothermal heat/power production and energy extraction system 156, not drawn to scale, which portion is mostly below the ground surface 119. A working fluid 102 used in the system 156 has a working fluid flow direction 102 that is generally opposite that of the system 1 of FIG. 1, discussed above. Extensive analysis has indicated that when using some working fluids, especially when in a supercritical mode for example, the flow direction 102 shown in FIG. 3 may increase power generation capacity for a given well depth. Extensive analysis has indicated that a working fluid 102 well-suited for this flow direction 102 may be a supercritical working fluid (generally, in a supercritical form, the working fluid is in a liquid state, but behaves like a gas) and/or a carbon dioxide ($CO_2$) working fluid 102, and especially when the carbon dioxide is in a supercritical state within the well (8 in FIG. 1) casing 109.

The partial system 156 as illustrated in FIG. 3 includes a well casing 109 having a larger, upper casing segment 109a, and a smaller, lower casing segment 109b, since, as explained in FIG. 1, deep wells utilize larger sized casing 109a near the top, and utilize smaller sized casing 109b as drilling depths increase (generally for ease of drilling purposes).

The casing segments 109a, 109b transport the working fluid 102 up and out the casing 109 to a turbine/generator 112 (shown here as an example of multiple turbine/generator options). While only two casing segments 109a,109b of different sizes are shown, the casing 109 may optionally have one casing 109 size, or more than two casing segments of different sizes, with the casing segments positioned (when in multiple segments) so that they are smaller as the depth below the ground surface 119 increases. The casing segments 109a, 109b serve to transport the working fluid 102 up and out of the well (8 in FIG. 1) through a working fluid supply pathway 154, comprised of the otherwise empty annular space between the interior wall of the casing 109 and the exterior wall of at least one of the working fluid return line 157 and the exterior wall of any insulation 110b surrounding the working fluid return line 157.

Figure 4:
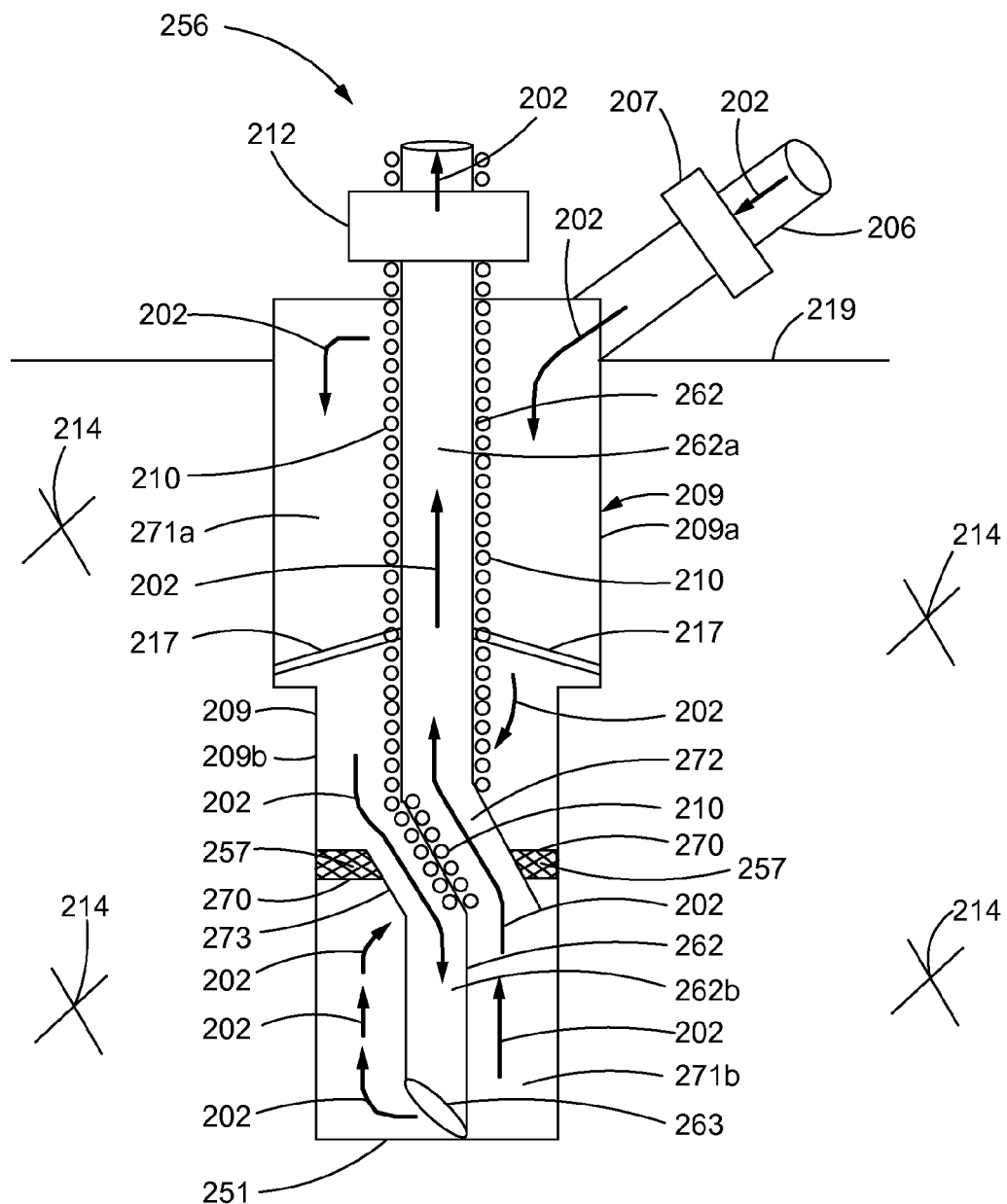
FIG. 4 is a side view of a geothermal energy extraction system having a liquid flow design in which working fluid initially flows downwardly through an outer, uninsulated, upper casing portion, crosses over (in a cross-over segment) to a bottom portion of a line centrally located within the well casing, and then discharges out of the central line to a bottom portion of the casing, where the working fluid reverses direction to begin traveling upwardly, then crosses back over (in the cross-over segment) into the central line, and then flows upwardly through an insulated portion of the central line to exit the well.

A return line 157 may be disposed within the well casing 109. The return line 157 may be structurally similar to the portion of the supply line 11 disposed inside the casing 9 described above in connection with the embodiment of FIG. 1, and therefore is alternatively referred to herein as a conduit or a central line. While the return line 157 is shown in FIG. 4 as being substantially coaxial with the casing 109, it may alternatively be offset from the axis of the casing, and therefore the term "central line" should not be construed as requiring a coaxial arrangement between the return line 157 and the casing 109. While structurally similar, the return line 157 may define a return flow path for the working fluid, while the supply line 11 of the FIG. 1 embodiment defines a supply flow path for the working fluid. The return line 157 may also have segments of different sizes. In the embodiment illustrated in FIG. 3, for example, the return line 157 may include an upper and larger return line segment 157a disposed within the upper casing segment 109a and a lower and smaller return line segment 157b disposed within the lower casing segment 109b. The upper return line segment 157a may be larger, in both interior and exterior diameters, than the lower return line segment 157b. Where feasible, due to already having a larger casing size 109a in the well's (8 in FIG. 1) upper portion (for drilling purposes), one may increase the size of the working fluid 102 return line 157a within the upper larger casing segment 109a (although not enough of a size increase so as to impair the minimum necessary working fluid 102 design flow rate up and out of the larger casing 109a segment through the working fluid supply line supply pathway 154), so as to lessen the adverse affect of return line 157 wall friction upon the working fluid 102. The same would generally be the case for the working fluid 102 supply pathway 154, so that a larger interior area and diameter was afforded a larger working fluid 2 supply pathway 154a within the larger well casing 109a, while a smaller, but still adequate, interior diameter and area was afforded a smaller working fluid pathway 154b within the smaller well casing 109b, so as to similarly reduce otherwise adverse affects of working fluid 102 wall friction within the working fluid supply pathway 154.

The sizing of the smaller interior area working fluid return pathway 113b within the smaller return line 157b within the lower portion of the well (8 ion FIG. 1), as well as the sizing of the smaller working fluid supply pathways 154b within the smaller casing 109b within the lower portion of the well (8 in FIG. 1), would be designed for the optimum possible working fluid 102 flow rate, within the constraints of the smaller well casing 109b size.

The same friction reduction design would hold true regarding a design for reduction of working fluid wall friction in FIG. 1, even though in FIG. 1, the direction of the return and supply working fluid flow is reversed from that as shown herein in FIG. 3.

A first insulation layer 110a may insulate 110 an upper portion of at least one of an exterior wall and an interior wall of the larger casing 109a, and at least one of an exterior wall and an interior wall of an upper portion of the smaller casing 109b. More specifically, the casing 109 may be insulated 110 down to a point where the surrounding geology 114 has a temperature that is equal to or exceeds the desired temperature of the working fluid 102 exiting the casing 109, thereby preventing adverse heat transfer from geothermally heated working fluid 102 exiting the upper portions of casing 109 to the relatively colder sub-surface geology 114 surrounding such upper portions of casing 109. In this regard, one may also insulate 110 an upper portion of the smaller casing 109b with such a first insulation layer 110a when advantageous.

The first insulation layer 110a may also extend upwardly from the casing 109a to at least the first turbine/generator (herein shown as a liquid drive turbine/generator 112), and may extend on to any additional power generating elements (such as the vapor driven turbine/generator, shown as 21 in FIG. 1, as an example).

The insulation 110, whether a first insulation layer 110a or a second insulation layer 110b, may be at least one of a good solid state insulation and a vacuum insulation (as more fully described above in FIG. 2 as 33). In the event a supercritical working fluid 102 (such as a supercritical carbon dioxide, or the like) is utilized, then the turbine/generator, shown herein as 112, may be a supercritical turbine/generator (which are generally known by those skilled in the art) and may be positioned where the vapor driven turbine/generator 21 is shown in FIG. 1. In this position, the supercritical turbine/generator is located at an elevation at least one of equal to and above at least one of the condenser (shown as 30 in FIG. 1) and the liquid holding tank (shown as 4 in FIG. 1), so that any liquid phase working fluid 102, may fall, via gravity, into at least one of the condenser (30 in FIG. 1) and the liquid holding tank (4 in FIG. 1).

Braces 117 may extend between the casing 109 and the return line 157 to support the return line 157. While two braces 117 are shown in FIG. 3, at least one and more than two brace(s) 117 may be utilized as necessary.

As explained, the substantially annular area between an exterior surface of the return line 157 (and the exterior wall of the insulation 110 if any) and the interior surface of the casing 109 (and the exterior wall of the insulation 110, if any insulation 110 is optionally on the interior wall of the casing 109) may herein form a supply passage/pathway 154 through which geothermally heated, liquid phase working fluid 102 flows upward and out of the casing 109 and well (8 in FIG. 1) to the turbine/generator 112.

A portion of the working fluid return line's 157 exterior surface may also be surrounded by an insulation layer 110b. In the illustrated embodiment, the insulation layer 110b surrounds both the larger size return line 157a and an upper portion of the smaller sized return line 157b, so as to help prevent unwanted and disadvantageous heat transfer between the cooler return working fluid 102 and the warmer supply working fluid 102.

In operation, cooler, denser, and heavier liquid phase working fluid 102 is transported to the well (8 in FIG. 1) through an above-ground liquid phase working fluid transport line 106, which line 106 is also shown herein as transporting the working fluid 102 through an optional liquid pump 107 and then through an otherwise sealed casing top 160. The working fluid 102 is next transported by gravity (with optional assistance at system start-up, and otherwise when deemed advantageous, from the liquid working fluid pump 107) all the way down the entire working fluid return line 157 to the lowermost, sealed bottom 151 of the casing 109. At the bottom 151 of the casing 109, the working fluid 102 is forced out of the return line 157, through the holes 155, by the force of gravity pressure upon the liquid working fluid 102 traveling down the working fluid return line 157. After being pushed out of the return line 157 through the holes 155 near the bottom 151 of the casing 109, the working fluid 102 is then immediately pushed upwardly into the lower and smaller working fluid supply pathway 154b.

As the working fluid 102 travels upwardly through the supply pathway 154, the working fluid 102 comes into contact with at least one uninsulated well casing segment 109c, where the working fluid gains geothermal heat from the surrounding geology 114. The heated, less dense, and lighter working fluid 102 is then forced and transmitted up and out of the upper well casing 109 a and well (8 in FIG. 1) by the gravitational force of the cooler and heavier return working fluid 102.

The smallest, lower return line segment 157b may rest on the sealed lower end 151 of the smaller well casing 109b to support the weight of at least some of the return line 157. In this configuration, as mentioned, the working fluid 102 traveling through the return line 157 may exit the lower return line segment 157b through holes 155 formed in the lower return line segment 157b. The number and size of the holes 155 may be selected to provide sufficient working fluid flow rate out of the return line 157. While holes 155 are shown in FIG. 3, slots or other shaped voids may be formed in the lowermost portion of the return line segment 157b so as to achieve the same result.

The upper casing segment 109a and the upper return line segment 157a, comprising a working fluid supply pathway 154 may fluidly communicate, via working fluid flow through an above ground surface 119 pipe segment 173, or the like, with power generating system components located above the ground surface 119, such as at least one turbine/generator 112, pump 107, and with other components described in connection with the other embodiments disclosed herein, as well as at least one or more of the other embodiments as disclosed in FIG. 1. After exiting the turbine/generator 112 as shown herein, the working fluid 102 may travel through all other necessary and optional above ground surface 119 embodiments as shown and described in FIG. 1, inclusive of phase changes in the working fluid 102 to a vapor phase (3 in FIG. 1), and ending via liquid phase working fluid 102 traveling back through an above-ground transport line 106 into and through an optional pump 107, before the liquid phase working fluid 102 flows to the return line 157 to repeat the process.

While the flow direction 102 of the working fluid 102 within the well casing 109 is reversed from that as shown in FIG. 1, the working fluid flow 102 design shown in FIG. 3 may be advantageous in some cases, as the amount of depth into the well (8 in FIG. 1) that the working fluid 102 would be maintained at a colder, denser, and heavier state would be maximized, thereby affording more gravitational pressure differentials that may be converted into more useful mechanical and/or electrical energy. This configuration, however, may require an insulation layer 110a surrounding the upper casing segment 109a and possibly an insulation layer 110a on an upper portion of the lower casing segment 109b, all in addition to certain portions of the return line 157 being provided with an insulation layer 110b. Accordingly, the feasibility of the partial system 156 of FIG. 3 may depend on whether the cost of the first insulation layer 110a is sufficiently offset by the increased gravitational and pressure differential that may be used to produce power and/or useful work.

Also, by delivering the coolest possible liquid working fluid 102 to the lower end of the lower casing segment 109b, the system 156 will more reliably push the geothermally warmed working fluid 102 up through the casing supply pathway 154 at a sufficient flow rate.

Additionally, to further eliminate the potential of geothermally heated working fluid 102 from traveling back up into the return line 157 through the holes 155, a third insulation layer 110c may be placed around (outside or inside, as preferred, although shown on the outside herein as an example) a lower portion of the lower casing segment 109b, including the bottom 151 of the lower casing segment 109b. The third insulation layer 110c may extend up to a level 161 that is at least one of equal to and slightly above the uppermost hole 155. By providing the third insulation layer 110c, the liquid phase working fluid 102 will not be significantly heated by the relatively warm surrounding geology 114 until the liquid working fluid 102 is above the uppermost hole 155, at which point the working fluid 102 will already be traveling in an upward direction. Accordingly, the relatively warm liquid phase working fluid 102 will tend to rise instead of sink back down through the relatively cool and potentially higher pressure working fluid 102 that is exiting the return line 157 at/near the bottom of the casing 109b at/near the bottom of the well (8 in FIG. 1).

As with the previous embodiments, the system 156 may be used without power generation equipment to simply provide heated working fluid 102 for any domestic, commercial, or industrial use above the ground surface 119.

FIG. 4 is a side view, not drawn to scale, of an alternative embodiment of the below-ground surface 219 portion of a geothermal heat/power production and energy extraction system 256. The system 256 employs a cross-over working fluid flow path segment 257 that combines some of the benefits described above with respect to the embodiments of FIGS. 1 and 3, without necessitating some of the insulation layers used in those embodiments.

More specifically, a well casing 209 may include an upper casing segment 209a and a lower casing segment 209b. The upper casing segment 209a may be larger than the lower casing segment 209b, similar to previous embodiments. A conduit may be disposed inside the casing 209 to define at least a portion of a distinct flow path through the casing 209. In the embodiment illustrated in FIG. 4, the conduit is provided as a central line 262 for transporting working fluid (indicated by single arrows 201). The central line 262 may be disposed substantially in a center of the well casing 209 as shown, or may be offset from the center of the casing 209, and therefore the term "central line" should not be construed as requiring a coaxial arrangement between the central line 262 and the casing 209.

A cross-over flow segment 257 is associated with the casing 209 and the central line 262. The cross-over flow segment 257 may include a seal body 270 that separates the casing 209 into an upper casing chamber 271a and a lower casing chamber 272b, and that separates the central line 262 into a central line upper chamber 262a and a central line lower chamber 262b. The cross-over flow segment 257 may further include one or more first flow passages 272 configured to fluidly communicate between the upper casing chamber 271a and the central line lower chamber 262b, as well as one or more second flow passages 273 configured to fluidly communicate between the central line upper chamber 262a and the lower casing chamber 271b. Accordingly, the cross-over flow segment 257 may direct cooled working fluid traveling downward from the upper casing chamber 271a to central line lower chamber 262b, while simultaneously directing geothermally heated working fluid 202 traveling upwardly from the lower casing chamber 271b into the central line upper chamber 262a. Thus, the cross-over flow segment 257 serves to alternate the working fluid 202 flow path between working fluid flow passages 272, 273 from one to another within the well (8 in FIG. 1). The central line upper chamber 262a, in turn, provides a working fluid 202 supply line that fluidly communicates with a turbine/generator 212 or other useful work extractor.

An insulation layer 210 may surround the central line upper chamber 262a, while the central line lower chamber 262b may be uninsulated (as shown herein). Alternatively, although not shown herein, the insulation layer 210 may be extended to also surround appropriate portions of the central line lower chamber 262b if needed to help advantageously maintain the weight and gravitational pressure of the working fluid 202 as it travels through the lowermost, warmest area of surrounding geology 214. Insulation may be comprised of a vacuum space insulation, such as 33 in FIG. 2. The insulation layer 210 is shown extending upwardly to at least a first turbine/generator 212 and may continue on to any additional power/work generating elements (such as the vapor driven turbine/generator 21 in FIG. 1, and at least one heat exchanger 22 in FIG. 1, as examples). The insulation layer 210 may be provided in the form of vacuum insulation, as more fully described as 33 in FIG. 1 above.

In operation, working fluid 202 initially flowing downwardly, coming from an above-ground liquid phase working fluid transport line 206, through an optional liquid pump 207, into the well casing 209 may first travel through the upper casing chamber 271a, generally defined as the otherwise empty annular space between an interior surface of the casing upper portion 209a and one of an exterior surface of the upper central line 262a (surrounding the central line upper chamber 262a) and an exterior surface of any insulation 210 surrounding the upper central line 262a. The cross-over flow segment 257 may then direct the working fluid from the casing upper chamber 271a to the central line lower chamber 262b. The working fluid 202 may next exit the central line lower chamber 262b through an angled lower distal end 263 (or, alternatively, through holes, or the like, shown as 155 in FIG. 3) into the lower casing chamber 271*b* located near the bottom 251 of the casing 209. The working fluid 202 then reverses course and is forced (by the gravitational pressure of the heavier cooler working fluid 202) to flow upwardly through the lower casing chamber 271*b* back toward the cross-over flow segment 257, during which upward flow on the way to the cross-over segment 257 the working fluid 202 is exposed to, and gains, geothermal heat form the surrounding geology 214. Once the upwardly traveling and now heated working fluid 202 reaches the cross-over flow segment 257, the working fluid 202 flows through a second flow passage 273 and is directed into the insulated 210 central line upper chamber 262*a*. The heated working fluid 202 then continues to flow upwardly through the central line upper chamber 262*a* until it exits the well (8 in FIG. 1) into a turbine/generator 212 or other work/heat extractor (as more fully shown in the above ground surface 19 embodiments in FIG. 1).

Extensive analysis has indicated that a working fluid 202 well-suited for utilization of the subject cross-over flow segment 257 design would be an R-134A working fluid 102, or the like. Also, while only one cross-over flow segment 257 is shown, more than one such cross-over flow segment 257 may be utilized when advantageous in any location throughout the casing 209.

One advantage of the partial system 256 of FIG. 4 is the reduction of insulation 201 requirements. In this embodiment, only the central line upper chamber 262*a* need be insulated, thereby materially reducing construction and installation costs due to reduced insulation requirements as compared to the embodiment of FIG. 3. Despite the reduction in insulation 210 as shown herein, the working fluid 202 delivered to the central line lower chamber 262*b* is still relatively cool and therefore provides gravitational weight/pressure advantages.

The central line 262 may have an angled lower end 263 to help insure full design working fluid 202 flow rates are not impaired, while still allowing a portion of the lower end 263 to contact the casing bottom 251, thereby to help support the central line 262. As a further alternative, an extra insulation layer (not shown) may be provided around the lower portion of the lower casing segment 209*b*, similar to the embodiment of FIG. 3, to help insure warmed working fluid 202 does not enter the central line 262 and impair operational efficiencies.

An optional liquid pump 207 is shown herein for perspective, as the partial system 256 may include the above ground level 219 components of a geothermal power production system (such as shown in FIG. 1). Additionally, braces 217 are shown to help support the weight of the central line 262. While only one set of braces 217 is shown, multiple braces may be used as necessary, and may be optionally located above and/or below the cross-over flow segment 257.

As with the previous embodiments, the partial system 256 may be used without power generation equipment to simply provide heated fluid for any domestic, commercial, or industrial use above the ground surface 219.

Figure 5:
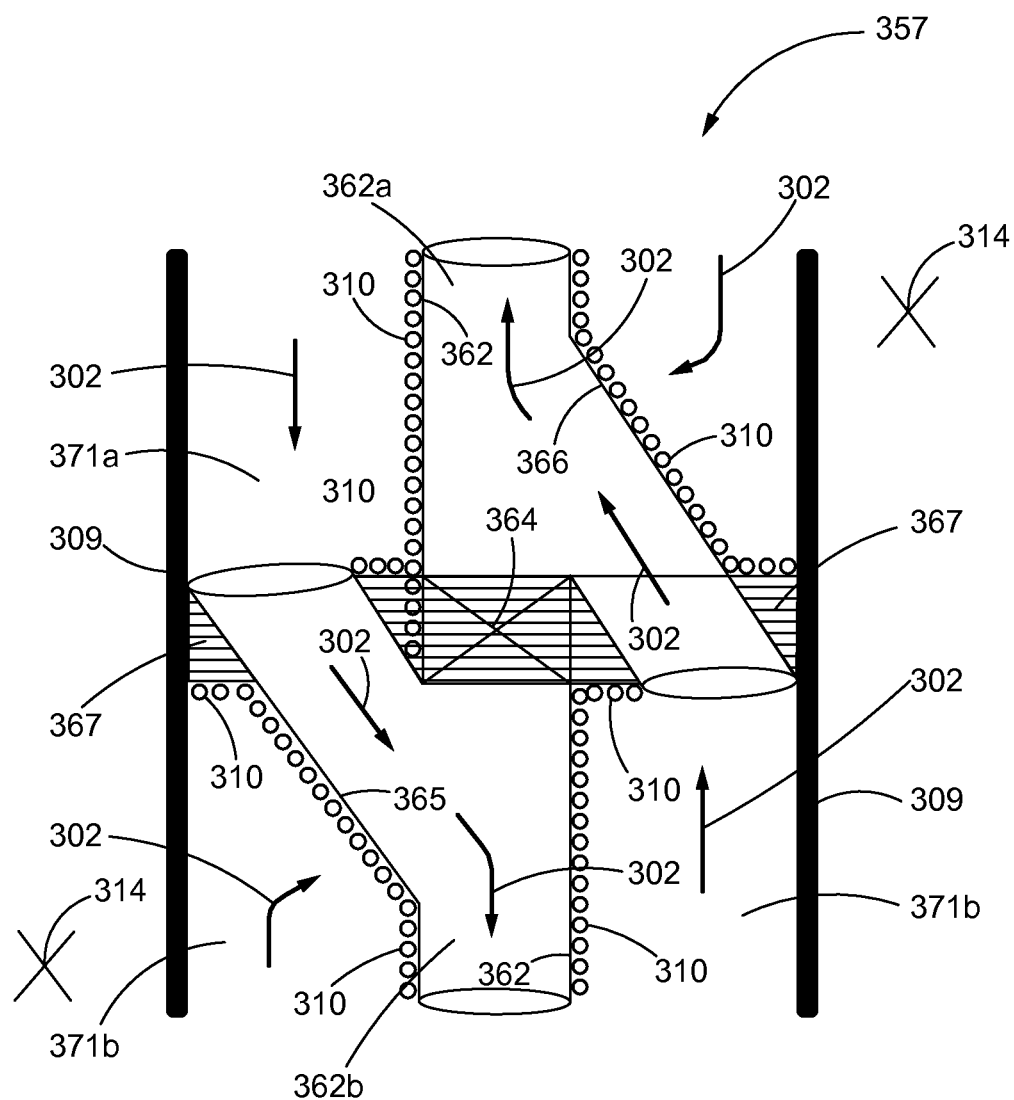
FIG. 5 is a side view of a working fluid cross-over design within the casing of a geothermal heat/power system.

FIG. 5 illustrates an alternative embodiment, not drawn to scale, of a cross-over flow segment 357 that may be used in place of the cross-over flow segment 257 described above in connection with FIG. 4. The cross-over flow segment 357 materially assists in maintaining the working fluid (having a flow direction indicated by arrows 302) at a cooler, and thus denser and heavier, state as it travels downwardly toward the warmest portion of the well (9 in FIG. 1), which is heated by the surrounding warm/hot geology 314. In so doing, the cross-over flow segment 357 helps maximize the pressure differential caused by gravity between the cooler/denser and heavier liquid phase working fluid 302 and the warmer/less dense and lighter liquid phase working fluid 302, thereby increasing the amount of mechanical and/or electrical power that can be generated by the system (such as a system 1 in FIG. 1, excepting for the cross-over working fluid flow segment 357 as shown herein).

The cross-over flow segment 357 may include a central line plug 364 which divides a central line 362 into a central line upper chamber 362*a* and a central line lower chamber 362*b* and prevents direct working fluid 302 communication between the central line upper and lower chambers 362*a*, 362*b*. As with the previous embodiments, the central line 362 may be substantially coaxial with the casing 309 or may be offset from an axis of the casing, and therefore the term "central line" should not be construed as requiring a coaxial arrangement between the central line 362 and the casing 309. Additionally, the central line 309 may be alternatively referred to herein as a conduit. The cross-over flow segment 357 may also include a casing plug 367 that similarly divides the casing 309 into a casing upper chamber 309*a* and a casing lower chamber 309*b*, while preventing direct working fluid 302 fluid communication from the casing upper chamber 371*a* to the casing lower chamber 371*b*. A first branch line 365 extends through the casing plug 367 and fluidly communicates between the casing upper chamber 371*a* and the central line lower chamber 362*b*. A second branch line 366 extends through the casing plug 367 and fluidly communicates between the casing lower chamber 371*b* and the central line upper chamber 362*a*. In the illustrated embodiment, the casing plug 367 is substantially aligned with the central line plug 364. However in other embodiments, the plugs 364, 367 may be offset.

In one operation, a working fluid 302 will follow a flow path identified by arrows 302 in FIG. 5 (although in another operation, the flow path of the working fluid 302 may be optionally reversed from that shown herein when advantageous). Here, cooler, denser, and heavier liquid phase working fluid 302 enters the casing upper chamber 371*a* and flows downwardly toward the cross-over flow segment 357. The casing plug 367 obstructs further flow through the well casing 309, while the first branch line 365 directs the working fluid 302 into the central line lower chamber 362*b*. Although not shown herein, as shown in FIG. 3, from the central line lower chamber 362*b*, the working fluid 302 may exit the lower end of the central line 362 and discharge into the casing lower chamber 371*b*. While not specifically shown in FIG. 5, the working fluid may impact a bottom (251 in FIG. 4) of the well casing 309 and reverse course to flow upwardly through the casing lower chamber 371*b* until it reaches the casing plug 367. The casing plug 367 again obstructs further flow through the well casing 309, but instead directs the working fluid 302 through the second branch line 366 and into the central line upper chamber 362*a*. The working fluid 302 then continues to flow through the central line upper chamber 362*a* to exit the casing 309 on its way to an above-ground turbine/generator or other component that advantageously uses the geothermally heated working fluid (such as shown and described in FIG. 1). The force to push the working fluid 302 upwardly through the casing lower chamber 371*b*, then through the first branch line 366, and up into the central line upper chamber 362*a* is provided by the force of gravity acting on the cooler/denser and heavier working fluid 302.

By providing the central line plug 364 to divide the central line 362 into two portions 362*a*,362*b*, instead of using two separate offset lines, a support means (such as the braces 217 of FIG. 4), may be used to support the entire central line 362 within the casing 309, without necessitating separate support means for separate upper and lower central lines. It will be appreciated, however, that other configurations, such as entirely separate lines as one other example, may be used to provide the upper and lower central line portions 362a,362b without departing from the scope of this disclosure.

The central line 362, both above and below the cross-over flow segment 357, may optionally be surrounded with an insulation layer 310, as advantageous. The central line plug 364 may include upper, lower, and optional side insulation layers 310, and the casing plug 367 may also include upper, lower, and optional side insulation layers 310, to help prevent natural heat transfer between the cooler and the warmer working fluid 302 within the cross-over flow segment 357 itself. The insulation 310 shown surrounding the portion of the central line 362 may be provided as vacuum space insulation, such as 33 in FIG. 2 as more fully described above. The insulation 310 surrounding the casing plug 367 and the central line plug 364 may optionally be comprised of a good solid-state insulation 310 material.

Figure 6:
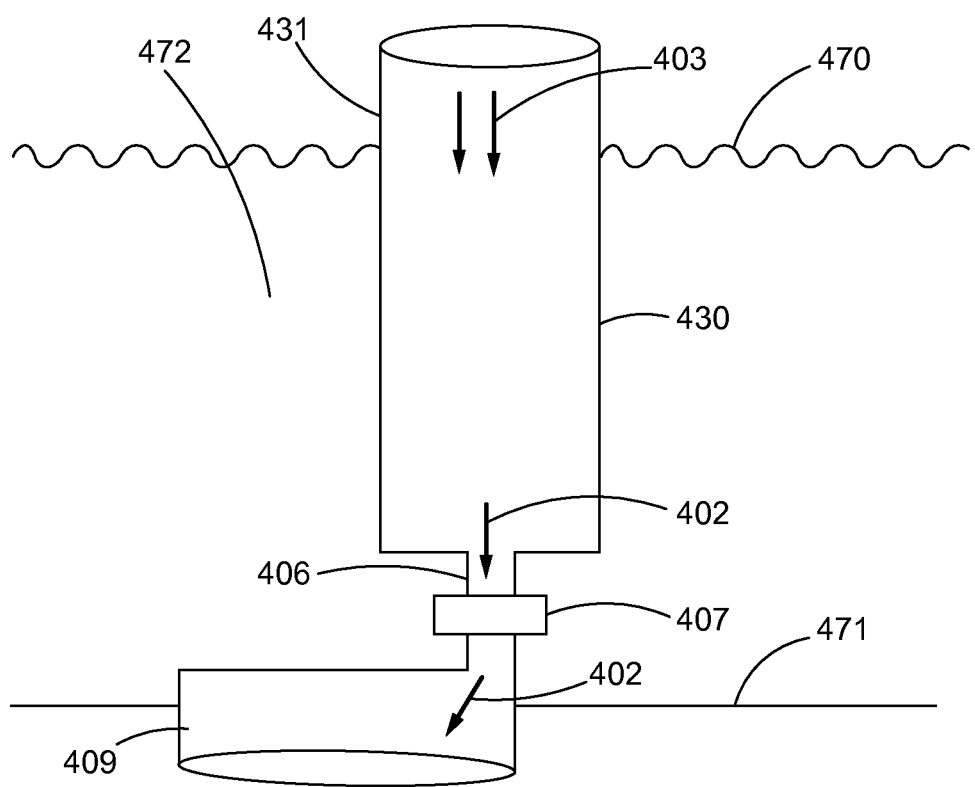
FIG. 6 is a side view of a condenser located below the water surface of a body of water.

FIG. 6 illustrates an alternative embodiment, not drawn to scale, of a partial geothermal heat/power production and energy extraction system in which a condenser 430 is located below a water surface 470, thereby eliminating the need for a power consuming and parasitic condenser fan (which fan is well understood by those skilled in the art). A body of water 472 (such as a lake, a river, the sea, or the like) is typically relatively cool, as opposed to the sometimes much warmer exterior air. Accordingly, placing the condenser 430 below the water surface 470 will serve to naturally cool and condense the vapor phase working fluid (shown by directional double arrows 403) into a liquid phase working fluid (shown by a directional single arrow 402) absent the need for an above ground surface condenser. Typical above-surface condensers, such as condenser 30 of FIG. 1, requires a fan (to circulate air) and/or a pump (to circulate water) to cool the condenser, thereby introducing a power consuming load that is detrimental to overall system (such as 1 in FIG. 1) operational efficiencies.

The condenser 430 of FIG. 6 may operate by having vapor phase working fluid traveling through a vapor transport line 431, a portion of which is located above the water surface 470. As the vapor transport line 431 traverses below the water surface 470, the hot vapor phase working fluid 403 interacts with the water 472 in a heat transfer relationship through the wall of the transport line 431 under the water surface 470, so that the transport line 431 itself serves to condense the vapor working fluid 403 into a liquid phase working fluid 402. The liquid phase working fluid 402 next travels down through a liquid phase working fluid transport line 406 into an optional liquid pump 407 (as is well understood by those skilled in the art, liquid pumps 407 can easily be designed to operate either above or below a water surface 470), and then travels down into well casing 409, which casing 409 extends below the water bed 472 and into a well (8 in FIG. 1).

Although not shown herein, the condenser 430 may be at least one of angled, zigzagged, spiraled, or the like, and may also be distributed into multiple smaller vapor transport line segments (being re-combined before entering the liquid phase working fluid transport line/pipe 406), to assist in efficient heat transfer from the warmer vapor phase working fluid 403 into the surrounding cooler water 472.

Although the condensed liquid working fluid 402 is only shown as entering well casing 409 for perspective, the well casing itself would have a centrally located working fluid transport line, shown above as a supply line 11 in FIG. 1 as an example, as well as other embodiments as shown above in FIG. 1, as an example.

It will be appreciated that the foregoing description provides examples of a single well, self-flow, geothermal system for at least one of power production and heat acquisition. It is contemplated, however, that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. Moreover, all methods described herein can be performed in any suitable order unless otherwise indicated herein or otherwise clearly contradicted by context.

What is claimed is:

1. A geothermal work production system for use with a well extending into a subsurface formation including a geothermal heat source, the system comprising:
   a transport line disposed above the well and defining a working fluid supply interface and a working fluid return interface;
   an energy extractor disposed in said transport line;
   a casing disposed in the well and defining a casing interior surface, said casing including a casing upper portion defining a casing opening fluidly communicating with said working fluid return interface, and a sealed casing bottom portion, wherein a heat exchange portion of said casing is located in thermal conductive relation to the geothermal heat source;
   a conduit assembly disposed in said casing and including:
      a first conduit segment having a first conduit interior surface defining a first conduit chamber, and a first conduit exterior surface;
      a first secondary line surrounding said first conduit segment and having a first secondary line interior surface spaced from said first conduit exterior surface; and
      said first conduit segment and said first secondary line cooperatively providing a first sealed vacuum chamber between said first conduit exterior surface and said first secondary line exterior surface, wherein said first sealed vacuum chamber is under at least a partial vacuum pressure;
   a second conduit assembly disposed in said casing and coupled to said first conduit assembly, said second conduit assembly including:
      a second conduit segment having a second conduit interior surface defining a second conduit chamber, and a second conduit exterior surface;
      a second secondary line surrounding said second conduit segment and having a second secondary line interior surface spaced from said second conduit exterior surface; and
      said second conduit segment and said second secondary line cooperatively providing a second sealed vacuum chamber between said second conduit exterior surface and said second secondary line exterior surface, wherein said second sealed vacuum chamber is under at least a partial vacuum pressure;
   said first and second conduit chambers cooperatively providing at least part of a unitary conduit chamber having a conduit chamber upper end fluidly communicating with said working fluid supply interface and a conduit chamber lower end; and
   a casing chamber substantially defined between said casing interior surface and said first and second secondary lines, said casing chamber including a casing chamber upper portion fluidly communicating with said casing opening, and a casing chamber lower portion fluidly communicating with said conduit chamber lower end.

2. The geothermal work production system of claim 1, further comprising at least one of a gas absorbing material, a radiant heat insulation layer, and a spacer disposed within each of said first and second sealed vacuum chambers.

3. The geothermal work production system of claim 1, further comprising a conduit assembly disposed within the casing, which conduit assembly has at least one of a portion of its lower distal end resting on the sealed lower distal end of the casing chamber and side supports extending to the interior casing wall.

4. The geothermal work production system of claim 1, further comprising a dual power production system design including a first and primary power production system with power generated directly by working fluid exiting the sub-surface geothermal heat exchanger, and a secondary power production system with power generated by waste heat from the primary power production system by waste heat transfer to a secondary and separate working fluid loop.

5. The geothermal work production system of claim 1, further comprising an above-ground liquid phase working fluid holding tank.

6. The geothermal work production system of claim 5, further comprising cut-off valves for isolating the liquid phase working fluid in the holding tank.

7. The geothermal work production system of claim 1, in which the working fluid comprises a supercritical working fluid.

8. The geothermal work production system of claim 1, in which the working fluid comprises carbon dioxide.

9. The geothermal work production system of claim 1, in which the working fluid comprises an R-134A refrigerant.

10. The geothermal work production system of claim 1, comprising a first and primary power production system with power generated directly by a pressure of a first and primary working fluid exiting the closed-loop sub-surface geothermal heat exchanger, and at least one additional secondary power production system, with power generated by heat from the first and primary power production system working fluid, being transferred to a secondary working fluid loop of the at least one additional secondary power production system.

11. A sub-surface geothermal heat exchanger comprising:
a well casing chamber disposed in a well and defining a casing interior surface, said casing including a casing upper portion defining a casing opening fluidly communicating with said working fluid return interface, and a sealed casing bottom portion, wherein a heat exchange portion of said casing is located in thermal conductive relation to the geothermal heat source; and a conduit assembly disposed in the upper portion of said casing and including:
 a first conduit segment having a first conduit interior surface defining a first conduit chamber, and a first conduit exterior surface;
 a first secondary line surrounding said first conduit segment and having a first secondary line interior surface spaced from said first conduit exterior surface; and
 said first conduit segment and said first secondary line cooperatively providing a first sealed vacuum chamber between said first conduit exterior surface and said first secondary line exterior surface, wherein said first sealed vacuum chamber is under at least a partial vacuum pressure; and
a plug across the interior portion of the well casing chamber, with the plug being installed at a depth within the well casing chamber where there is a sufficient geothermal heat temperature below the plug to heat and lighten the cooler and heavier working fluid entering the well to an operable system temperature and pressure necessary for the geothermally heated and lightened working fluid to exit the well and to travel through a turbine and to produce power, without the necessity for any electrically operated pump and/or for any fuel operated pump to pump the working fluid into and/or out of the well casing; and
where the plug has both an entranceway for the incoming and down-well cooler working fluid and a return and exit-way for the outgoing and up-well geothermally heated working fluid; and
which working fluid incoming entranceway through the plug is operably connected to a third and un-insulated working fluid conduit segment within the well casing that directs the cooler incoming working fluid, traveling down-well, toward the lower distal end of the well casing; and
which working fluid outgoing and up-well return exit-way through the plug is operably connected to the insulated first conduit segment, which directs the warmer outgoing working fluid up and out of the well casing; and
with the plug having cross-over working fluid flow segments defining a first cross-over flow branch extending through said casing plug and fluidly communicating between said casing's upper chamber and said third un-insulated conduit segment in the lower chamber, and a second cross-over flow branch extending through said casing plug and fluidly communicating between said casing's lower chamber and said upper vacuum insulated first conduit segment.

12. The sub-surface geothermal heat exchanger of claim 11, in which the working fluid comprises an R-134A refrigerant.

* * * * *